US010315488B2

(12) United States Patent
Miyakoshi et al.

(10) Patent No.: US 10,315,488 B2
(45) Date of Patent: Jun. 11, 2019

(54) REFRIGERATION DEVICE WITH EXPANSION VALVE COIL TEMPERATURE CORRECTION

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

(21) Appl. No.: 15/304,942

(22) PCT Filed: Mar. 16, 2015

(86) PCT No.: PCT/JP2015/057720
§ 371 (c)(1),
(2) Date: Oct. 18, 2016

(87) PCT Pub. No.: WO2015/159625
PCT Pub. Date: Oct. 22, 2015

(65) Prior Publication Data
US 2017/0182865 A1  Jun. 29, 2017

(30) Foreign Application Priority Data

Apr. 18, 2014  (JP) .................................. 2014-086376

(51) Int. Cl.
*B60H 1/00* (2006.01)
*B60H 1/32* (2006.01)
(Continued)

(52) U.S. Cl.
CPC ..... *B60H 1/00485* (2013.01); *B60H 1/00392* (2013.01); *B60H 1/00885* (2013.01);
(Continued)

(58) Field of Classification Search
CPC .............. B60H 1/00485; B60H 1/3205; B60H 2001/3267; B60H 2001/3285
See application file for complete search history.

(56) References Cited

U.S. PATENT DOCUMENTS

| 4,835,976 A * | 6/1989 | Torrence ............... F25B 41/062 62/115 |
| 5,077,983 A * | 1/1992 | Dudley ................... F25B 13/00 236/75 |
| 2012/0234030 A1* | 9/2012 | Hagita .................... F04B 35/04 62/129 |

FOREIGN PATENT DOCUMENTS

| JP | 09-066736 A | 3/1997 |
| JP | 09-300951 A | 11/1997 |
| JP | 2012-176660 A | 9/2012 |

OTHER PUBLICATIONS

JP 2007-002671 (English Abstract).*
(Continued)

*Primary Examiner* — Jonathan Bradford
(74) *Attorney, Agent, or Firm* — Baker Botts LLP

(57) ABSTRACT

There is disclosed a refrigeration device which is capable of inexpensively improving durability of an electronic expansion valve (an outdoor expansion valve) for use in a refrigerant circuit. A vehicle air conditioner 1 has a refrigerant circuit R including an outdoor expansion valve 6. The vehicle air conditioner includes a controller which controls energization to a coil of the outdoor expansion valve 6, and this controller executes operation limit control to limit an operation of the outdoor expansion valve 6 so that a temperature of the coil of the outdoor expansion valve 6 is not in excess of a predetermined value. The controller lengthens a control period of the outdoor expansion valve 6 and suppresses an operation amount of the outdoor expansion
(Continued)

valve 6 within a predetermined limit value to limit a duty factor, in the operation limit control.

9 Claims, 13 Drawing Sheets

(51) Int. Cl.
| | |
|---|---|
| *F25B 5/04* | (2006.01) |
| *F25B 6/02* | (2006.01) |
| *F25B 40/00* | (2006.01) |
| *F25B 40/02* | (2006.01) |
| *F25B 41/04* | (2006.01) |
| *B60H 1/22* | (2006.01) |

(52) U.S. Cl.
CPC ....... *B60H 1/00921* (2013.01); *B60H 1/2221* (2013.01); *B60H 1/3204* (2013.01); *B60H 1/3205* (2013.01); *F25B 5/04* (2013.01); *F25B 6/02* (2013.01); *F25B 40/00* (2013.01); *F25B 40/02* (2013.01); *F25B 41/04* (2013.01); *F25B 41/043* (2013.01); *B60H 2001/00957* (2013.01); *B60H 2001/3264* (2013.01); *B60H 2001/3266* (2013.01); *B60H 2001/3267* (2013.01); *B60H 2001/3285* (2013.01)

(56) References Cited

OTHER PUBLICATIONS

JP 2008-273338 (English Translation).*
Japan Patent Office, International Search Report for PCT/JP2015/057720, dated Jun. 16, 2015.
The State Intellectual Property Office of the People's Republic of China, The First Office Action issued in Chinese Application No. 201580020228.X, dated Mar. 2, 2018.
The State Intellectual Property Office of the People's Republic of China, The Second Office Action issued in Chinese Application No. CN 201580020228.X, dated Sep. 4, 2018.

* cited by examiner

FIG. 7

| | DUTY FACTOR OF 35% OR LESS | | DUTY FACTOR OF 30% OR LESS | |
|---|---|---|---|---|
| | OPERABLE TIME | MAX PLS NO. PER OPERATION | OPERABLE TIME | MAX PLS NO. PER OPERATION |
| ONE OPERATION IN 3 sec | 0.05sec | 4.5 PLS | — | — |
| ONE OPERATION IN 4 sec | 0.4sec | 36 PLS | 0.2sec | 18 PLS |
| ONE OPERATION IN 5 sec | 0.75sec | 67.5 PLS | 0.5sec | 46 PLS |

REFRIGERATION DEVICE WITH EXPANSION VALVE COIL TEMPERATURE CORRECTION

CROSS-REFERENCE TO RELATED APPLICATIONS

This application is a U.S. National Stage Patent Application under 37 U.S.C. § 371 of International Patent Application No. PCT/JP2015/057720, filed on Mar. 16, 2015, which claims the benefit of Japanese Patent Application No. JP 2014-086376, filed on Apr. 18, 2014, the disclosures of each of which are incorporated herein by reference in their entirety.

TECHNICAL FIELD

The present invention relates to a refrigeration device having a refrigerant circuit using an electronic expansion valve.

BACKGROUND ART

Heretofore, in this type of refrigeration device, for example, a vehicle air conditioner which conditions air of a vehicle interior of a car (a vehicle), an electronic expansion valve has been used as throttle means of a refrigerant circulating through a refrigerant circuit. In this electronic expansion valve, a coil is energized at a predetermined pulse number, to adjust a valve position, but the coil heats itself by the energization, and hence a temperature of the coil rises (e.g., see Patent Document 1).

CITATION LIST

Patent Documents

Patent Document 1: Japanese Patent Application Publication No. 2012-176660

SUMMARY OF THE INVENTION

Problems to be Solved by the Invention

FIG. 13 is a diagram showing a relation between a duty factor (%) to a coil of such an electronic expansion valve and a coil temperature (° C.). In this drawing, the abscissa indicates the duty factor to the coil of the electronic expansion valve, and the ordinate indicates the temperature of the coil (the coil temperature). Furthermore, TcoilHiLim is a heat resistant temperature of the coil, and is usually about +150° C. Furthermore, an engine room of a car including the electronic expansion valve has a high temperature environment at the highest temperature of about +120° C., and hence an ambient temperature of the electronic expansion valve during measurement is set at +120° C. (example) of the worst environment.

As it is clear from the drawing, the coil temperature rises with increase of the duty factor in the form of a linear function. Further, when the duty factor increases up to 40%, the coil temperature is in excess of the heat resistant temperature TcoilHiLim. When the coil of the electronic expansion valve is in excess of the heat resistant temperature, burning damages and the like occur, and it follows that durability of the electronic expansion valve is remarkably impaired. To eliminate such a problem, when the electronic expansion valve having a high heat resistance is employed, there has been the problem that component cost significantly soars this time.

The present invention has been developed to solve such conventional technical problems, and an object thereof is to provide a refrigeration device which is capable of inexpensively improving durability of an electronic expansion valve for use in a refrigerant circuit.

Means for Solving the Problems

A refrigeration device of the present invention has a refrigerant circuit including an electronic expansion valve, and includes control means for controlling energization to a coil of the electronic expansion valve, and is characterized in that this control means executes operation limit control to limit an operation of the electronic expansion valve so that a temperature of the coil of the electronic expansion valve is not in excess of a predetermined value.

The refrigeration device of an invention described herein is characterized in that in the above invention, the control means lengthens a control period of the electronic expansion valve and suppresses an operation amount of the electronic expansion valve within a predetermined limit value to limit a duty factor, in the operation limit control.

The refrigeration device of an invention described herein is characterized in that in the above invention, the control means executes the operation limit control in a case where the temperature of the coil rises to the predetermined value.

The refrigeration device of an invention described herein is characterized in that in the above invention, the control means estimates the temperature of the coil on the basis of an energizing situation to the coil of the electronic expansion valve, and an ambient temperature of the electronic expansion valve or the highest temperature presumed at the ambient temperature.

The refrigeration device of an invention described herein is characterized in that in the invention of claim 2, the control means executes the operation limit control in a case where there is established one of a condition that the ambient temperature of the electronic expansion valve is high, a condition that a temperature of engine cooling water is high when performing vehicle interior air conditioning of a car, a condition that an engine lubricating oil temperature is high when performing the vehicle interior air conditioning of the car, a condition that an engine suction air temperature is high when performing the vehicle interior air conditioning of the car, and a condition that a velocity is slow and an outdoor air temperature is high when performing the vehicle interior air conditioning of the car, or any combination of the conditions, or all of the conditions.

The refrigeration device of an invention described herein is characterized in that in the inventions of claim 3 to claim 5, the control means cancels the operation limit control or increases a limit value in a case where the operation amount of the electronic expansion valve has a margin to the limit value, when the control means executes the operation limit control.

The refrigeration device of an invention described herein is characterized in that in the inventions of claim 3 to claim 5, the control means integrates a difference between the limit value and the operation amount of the electronic expansion valve when executing the operation limit control, and the control means cancels the operation limit control or increases the limit value in a case where the integrated value enlarges.

The refrigeration device of an invention described herein is characterized in that in the above respective inventions, the control means does not execute the operation limit control in a transitional stage of an operating state.

The refrigeration device of an invention described herein is characterized in that in the above respective inventions, the control means does not execute the operation limit control when returning a valve position of the electronic expansion valve to an initial position.

The refrigeration device of an invention described herein is characterized in that in the above respective inventions, the control means does not execute the operation limit control in a mode to perform heating and/or a mode to perform dehumidifying and heating by the refrigerant circuit.

Advantageous Effect of the Invention

According to the present invention, a refrigeration device having a refrigerant circuit including an electronic expansion valve includes control means for controlling energization to a coil of the electronic expansion valve, and this control means executes operation limit control to limit an operation of the electronic expansion valve so that a temperature of the coil of the electronic expansion valve is not in excess of a predetermined value. Therefore, it is possible to avoid, in advance, the disadvantage that the temperature of the coil of the electronic expansion valve is in excess of its heat resistant temperature due to self-heating occurred by the energization, and it is possible to achieve improvement of durability.

This produces a remarkable effect especially in the electronic expansion valve for use in the vehicle air conditioner in which a use environment becomes worst. Furthermore, it is not necessary to change to an electronic expansion valve having a high heat resistance, and hence it is also possible to prevent the disadvantage that production cost soars.

In this case, when the control means lengthens a control period of the electronic expansion valve and suppresses an operation amount of the electronic expansion valve within a predetermined limit value to limit a duty factor in the operation limit control as in an invention described herein, it is possible to accurately and effectively inhibit rise of the coil temperature of the electronic expansion valve.

Further, when the control means executes the operation limit control in a case where the temperature of the coil rises to the predetermined value as in an invention described herein, this predetermined value is set to be not more than a heat resistant temperature of the coil of the electronic expansion valve, thereby making it possible to securely avoid the disadvantage that the temperature of the coil is in excess of the heat resistant temperature.

In this case, when the control means estimates the temperature of the coil on the basis of an energizing situation to the coil of the electronic expansion valve, and an ambient temperature of the electronic expansion valve or the highest temperature presumed at the ambient temperature as in an invention described herein, it is possible to estimate, as the temperature of the coil, a temperature obtained by adding a self-heating level to the ambient temperature in a case where the ambient temperature of the electronic expansion valve is detectable. On the other hand, in a case where the ambient temperature is not detectable, it is possible to estimate, as the temperature of the coil, a temperature obtained by adding the self-heating level to the highest temperature presumed as the ambient temperature, and in any case, it is possible to achieve protection of the electronic expansion valve and to improve its durability without disposing any special sensor to detect the coil temperature of the electronic expansion valve.

On the other hand, as in an invention described herein, the control means may execute the operation limit control in a case where there is established one of a condition that the ambient temperature of the electronic expansion valve is high, a condition that a temperature of engine cooling water is high when performing vehicle interior air conditioning of a car, a condition that an engine lubricating oil temperature is high when performing the vehicle interior air conditioning of the car, a condition that an engine suction air temperature is high when performing the vehicle interior air conditioning of the car, and a condition that a velocity is slow and an outdoor air temperature is high when performing the vehicle interior air conditioning of the car, or any combination of the conditions, or all of the conditions. Each of these conditions is a condition that the temperature of the coil of the electronic expansion valve is easy to rise, and hence it is possible to effectively achieve the protection of the electronic expansion valve, even when executing the operation limit control by such establishing of the conditions.

Furthermore, according to inventions described herein, the control means cancels the operation limit control or increases a limit value in a case where the operation amount of the electronic expansion valve has a margin to the limit value, when the control means executes the operation limit control. Therefore, when the operation amount of the electronic expansion valve sufficiently has the margin to the limit value during the operation limit control, the control means cancels the control or increases the limit value, and can avoid unnecessary operation limit to minimize deterioration of response properties.

Furthermore, according to inventions described herein, the control means integrates a difference between the limit value and the operation amount of the electronic expansion valve when executing the operation limit control, and the control means cancels the operation limit control or increases the limit value in a case where the integrated value enlarges. Therefore, when the operation amount of the electronic expansion valve is sufficiently smaller than the limit value during the operation limit control, the control means cancels the control or increases the limit value, and can avoid the unnecessary operation limit to minimize the deterioration of the response properties.

In the above-mentioned inventions, when the control means does not execute the operation limit control in a transitional stage of an operating state as in an the invention described herein, it is possible to rapidly operate the electronic expansion valve in a transitional stage such as an operation start initial stage or a time when setting is changed, and it is possible to secure control properties.

Furthermore, when the control means does not execute the operation limit control when returning a valve position of the electronic expansion valve to an initial position as in an invention described herein, it is possible to rapidly perform so-called initialization of the electronic expansion valve, and it is possible to secure the control properties.

Furthermore, when the control means does not execute the operation limit control in a mode to perform heating and/or a mode to perform dehumidifying and heating by the refrigerant circuit as in an invention described herein, it is possible to secure the control properties without executing the operation limit control under an environment where the ambient temperature of the coil of the electronic expansion valve lowers.

BRIEF DESCRIPTION OF THE DRAWINGS

FIG. 7 is a diagram showing a relation between the duty factor of the outdoor expansion valve of FIG. 1 and a limit value;

MODE FOR CARRYING OUT THE INVENTION

Hereinafter, embodiments of the present invention will be described in detail with reference to the drawings.

Embodiment 1

Figure 1:
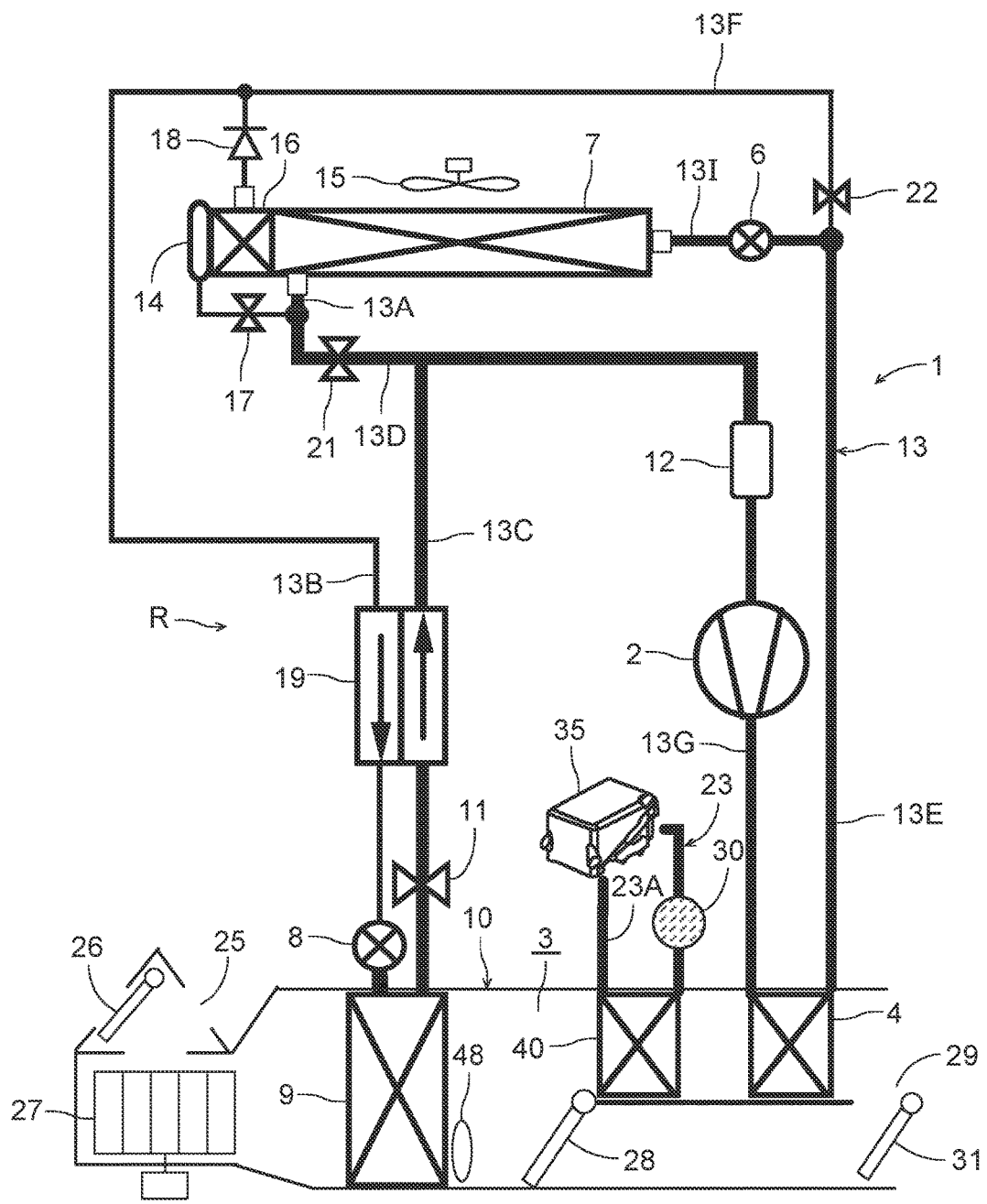
FIG. 1 is a constitutional view of a vehicle air conditioner as one embodiment of a refrigeration device to which the present invention is applied.

FIG. 1 shows a constitutional view of a vehicle air conditioner 1 as one embodiment of a refrigeration device of the present invention. In this case, a vehicle of the embodiment to which the present invention is applied is an electric car (EV) which does not have an engine (an internal combustion engine) and which runs by driving an electric motor for running with power charged in a battery (which is not shown in the drawing), and the vehicle air conditioner 1 of the present invention is also driven with the power of the battery.

That is, the vehicle air conditioner 1 of the embodiment performs heating by a heat pump operation using a refrigerant circuit in an electric car in which it is not possible to perform heating by engine waste heat, and further, the vehicle air conditioner selectively executes respective operation modes of dehumidifying and heating, dehumidifying and cooling, cooling, and the like. It is to be noted that the vehicle is not limited to the electric car, and the present invention is also effective for a so-called hybrid car using the engine together with the electric motor for running. Furthermore, the present invention is also applicable to a usual car which runs with the engine, and when a temperature environment of an engine room is taken into consideration, it is considered that the present invention described below is especially effective for these cars including the engines.

The vehicle air conditioner 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant to raise a pressure, a radiator 4 disposed in an air flow passage 3 of an HVAC unit 10 in which vehicle interior air passes and circulates, to let the high-temperature high-pressure refrigerant discharged from the compressor 2 radiate heat in the vehicle interior, an outdoor expansion valve (ECCV) 6 constituted of an electronic expansion valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electronic expansion valve which decompresses and expands the refrigerant, a heat absorber 9 disposed in the air flow passage 3 to let the refrigerant absorb heat from interior and exterior of the vehicle during the cooling and during the dehumidifying and heating, an evaporation capability control valve 11 which adjusts an evaporation capability in the heat absorber 9, an accumulator 12 and the like, thereby constituting a refrigerant circuit R.

It is to be noted that the compressor 2, the outdoor expansion valve 6 and the outdoor heat exchanger 7 are installed in an engine room outside the vehicle interior. Furthermore, in the outdoor heat exchanger 7, an outdoor blower 15 is disposed to perform the heat exchange between the outdoor air and the refrigerant during stop of the vehicle. Here, in the case of the electric car, the engine is not present, but a vehicle exterior space in which a device such as a running motor and the like are installed will be referred to as the engine room in the present invention. Furthermore, in the case of a usual car or the hybrid car, needless to say, the engine room is a space in which the engine is installed.

Furthermore, the outdoor heat exchanger 7 has a header portion 14 and a subcooling portion 16 successively on a refrigerant downstream side, a refrigerant pipe 13A extending out from the outdoor heat exchanger 7 is connected to the header portion 14 via a solenoid valve (an opening/closing valve) 17 opened during the cooling, and an outlet of the subcooling portion 16 is connected to the indoor expansion valve 8 via a check valve 18. It is to be noted that the header portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on the downstream side of the check valve 18 via a solenoid valve (an opening/closing valve) 22 to be opened during the dehumidifying.

Furthermore, in the air flow passage 3 on an air upstream side of the heat absorber 9, respective suction ports such as an indoor air suction port and an outdoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit as auxiliary heating means disposed in the vehicle air conditioner 1 of the embodiment. The heating medium circulating circuit 23 includes a circulating pump 30 constituting circulating means, a heating medium heating electric heater 35, and a heating medium-air heat exchanger 40 disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 improves electric safety of a passenger.

Furthermore, in the air flow passage 3 on the air upstream side of the heating medium-air heat exchanger 40 and the radiator 4, an air mix damper 28 is disposed to adjust a degree of flow of the indoor air or the outdoor air through the radiator 4. Furthermore, in the air flow passage 3 on an air downstream side of the radiator 4, there is formed each outlet (represented by an outlet 29 in FIG. 1) of foot, vent or defroster, and in the outlet 29, an outlet changing damper 31 is disposed to perform changing control of blowing of the air from each outlet mentioned above.

Figure 2:
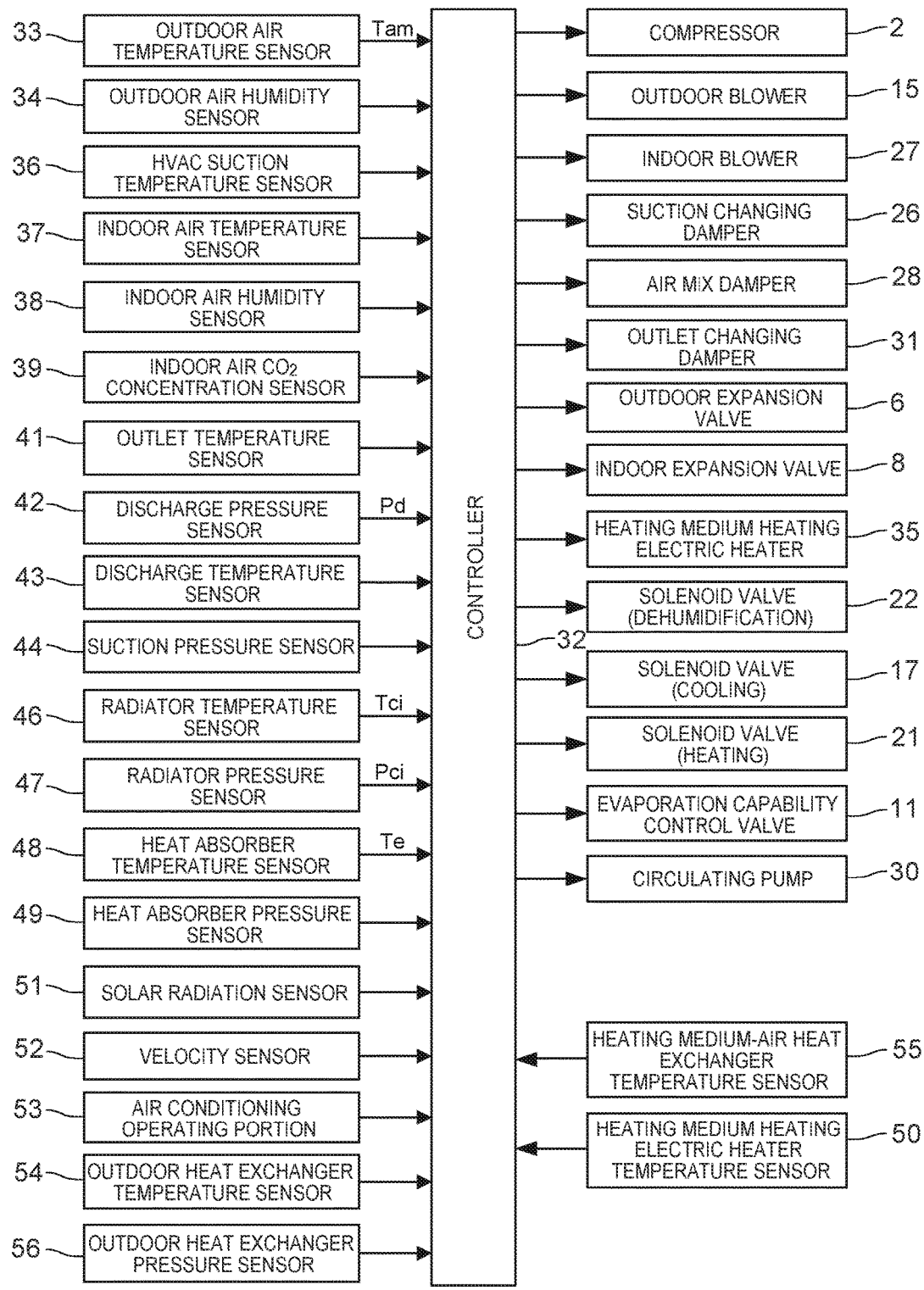
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an engine room temperature sensor 34 to detect a temperature of the above-mentioned engine room which is an ambient temperature of the outdoor expansion valve 6, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the temperature of the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

Furthermore, the input of the controller 32 is further connected to respective outputs of a heating medium heating electric heater temperature sensor 50 which detects a temperature of the heating medium heating electric heater 35 of the heating medium circulating circuit 23, and a heating medium-air heat exchanger temperature sensor 55 which detects a temperature of the heating medium-air heat exchanger 40.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17 and 21, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the above-mentioned constitution will be described. The controller 32 changes and executes respective roughly divided operation modes such as a heating mode (a mode to perform heating by the refrigerant circuit R), a dehumidifying and heating mode (a mode to perform the dehumidifying and heating by the refrigerant circuit R), an internal cycle mode, a dehumidifying and cooling mode, and a cooling mode. First, flow of the refrigerant in each operation mode will be described.

(1) Heating Mode

When the heating mode is selected by the controller 32 or a manual operation to the air conditioning operating portion 53, the controller 32 opens the solenoid valve 21 and closes the solenoid valve 17 and the solenoid valve 22. Further, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the heating medium-air heat exchanger 40 (in a case where the heating medium circulating circuit 23 is operating) and is then heated by the high-temperature refrigerant in the radiator 4. On the other hand, the refrigerant in the radiator 4 has the heat taken by the air and is cooled to condense and liquefy.

The refrigerant liquefied in the radiator 4 flows through the refrigerant pipe 13E to reach the outdoor expansion valve 6, is decompressed therein and then flows into the outdoor heat exchanger 7. The refrigerant flowing into the outdoor heat exchanger 7 evaporates, and the heat is pumped up from the outdoor air passed by running or the outdoor blower 15 (a heat pump). Further, the low-temperature refrigerant flowing out from the outdoor heat exchanger 7 flows through the refrigerant pipe 13D and the solenoid valve 21 to flow from the refrigerant pipe 13C into the accumulator 12 to perform gas liquid separation, and then the gas refrigerant is sucked into the compressor 2, thereby repeating this circulation. The air heated in the heating medium-air heat exchanger 40 and the radiator 4 is blown out from the outlet 29, thereby performing the heating of the vehicle interior.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of a temperature of the radiator 4 (a radiator temperature TCI) which is detected by the radiator temperature sensor 46, and controls a subcool degree SC of the refrigerant in the outlet of the radiator 4.

Figure 3:
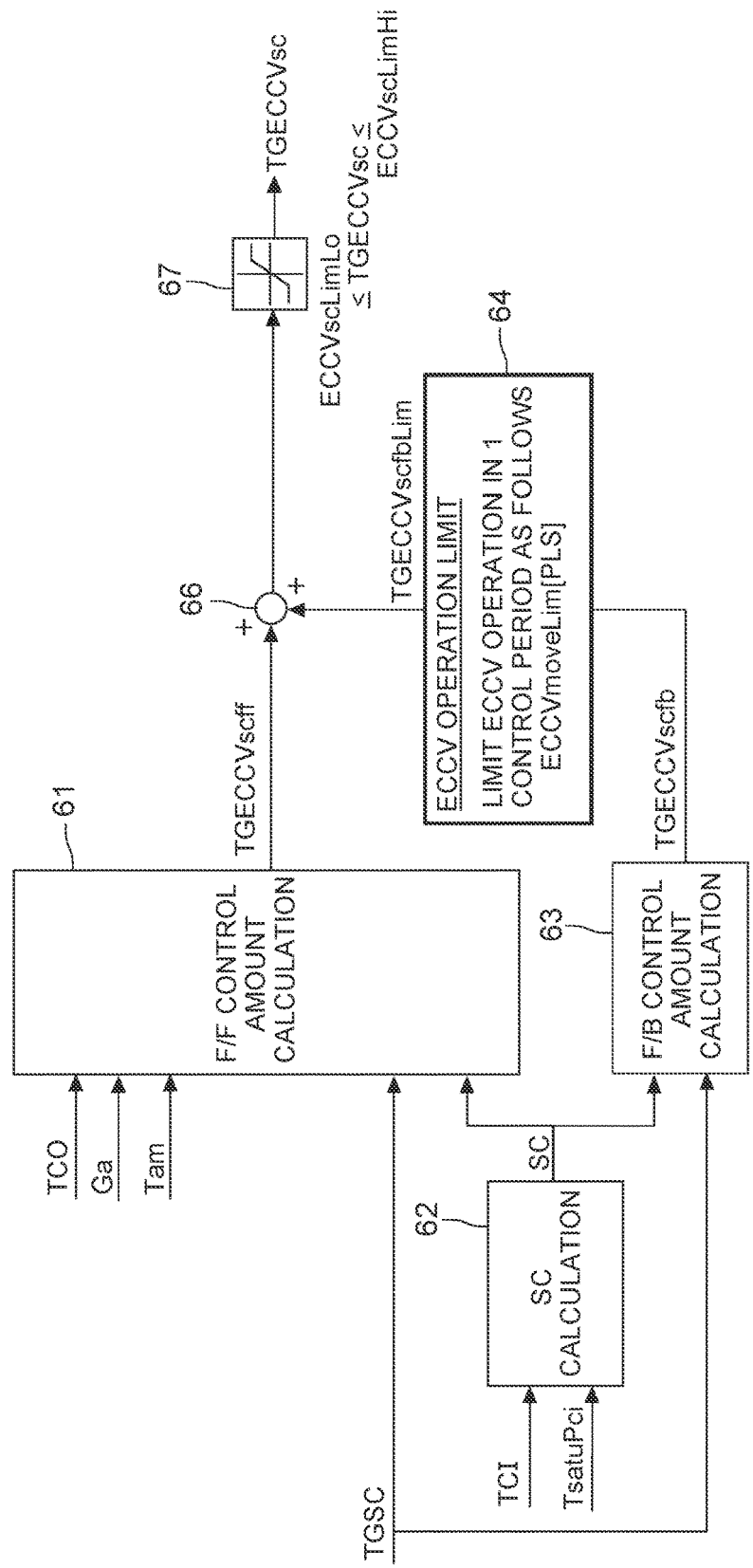
FIG. 3 is a control block diagram concerning outdoor expansion valve (electronic expansion valve) control in a heating mode of the controller of FIG. 2.

FIG. 3 is a control block diagram of the controller 32 which determines a target position (an outdoor expansion valve target position) TGECCVsc of the outdoor expansion valve 6 in the heating mode. An F/F control amount calculation section 61 of the controller 32 calculates an F/F control amount TGECCVscff of the outdoor expansion valve target position on the basis of a target subcool degree TGSC that is a target value of the subcool degree SC in the outlet of the radiator 4, the subcool degree SC calculated from the radiator temperature TCI and a saturation temperature TsatuPci by a calculation section 62, a radiator target temperature TCO, a mass air volume Ga of the air flowing into the air flow passage 3, and an outdoor air temperature Tam.

Furthermore, an F/B control amount calculation section 63 calculates an F/B control amount TGECCVscfb of the outdoor expansion valve target position on the basis of the target subcool degree TGSC and the subcool degree SC. An ECCV operation limit section 64 adds an operation limit by after-mentioned operation limit control of the outdoor expansion valve 6 to the F/B control amount TGECCVscfb calculated by the F/B control amount calculation section 63, and the ECCV operation limit section 64 outputs the amount as a limit F/B control amount TGECCVscfbLim. Further, the F/F control amount TGECCVscff calculated by the F/F control amount calculation section 61 and the limit F/B control amount TGECCVscfbLim output from the ECCV operation limit section 64 are added by an adder 66, a limit setting section 67 attaches limits of an upper limit of controlling and a lower limit of controlling, and then the outdoor expansion valve target position TGECCVsc is determined. In the heating mode, the controller 32 controls the valve position of the outdoor expansion valve 6 on the basis of the outdoor expansion valve target position TGECCVsc.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 (a heat absorber temperature Te) which is detected by the heat absorber temperature sensor 48.

Figure 4:
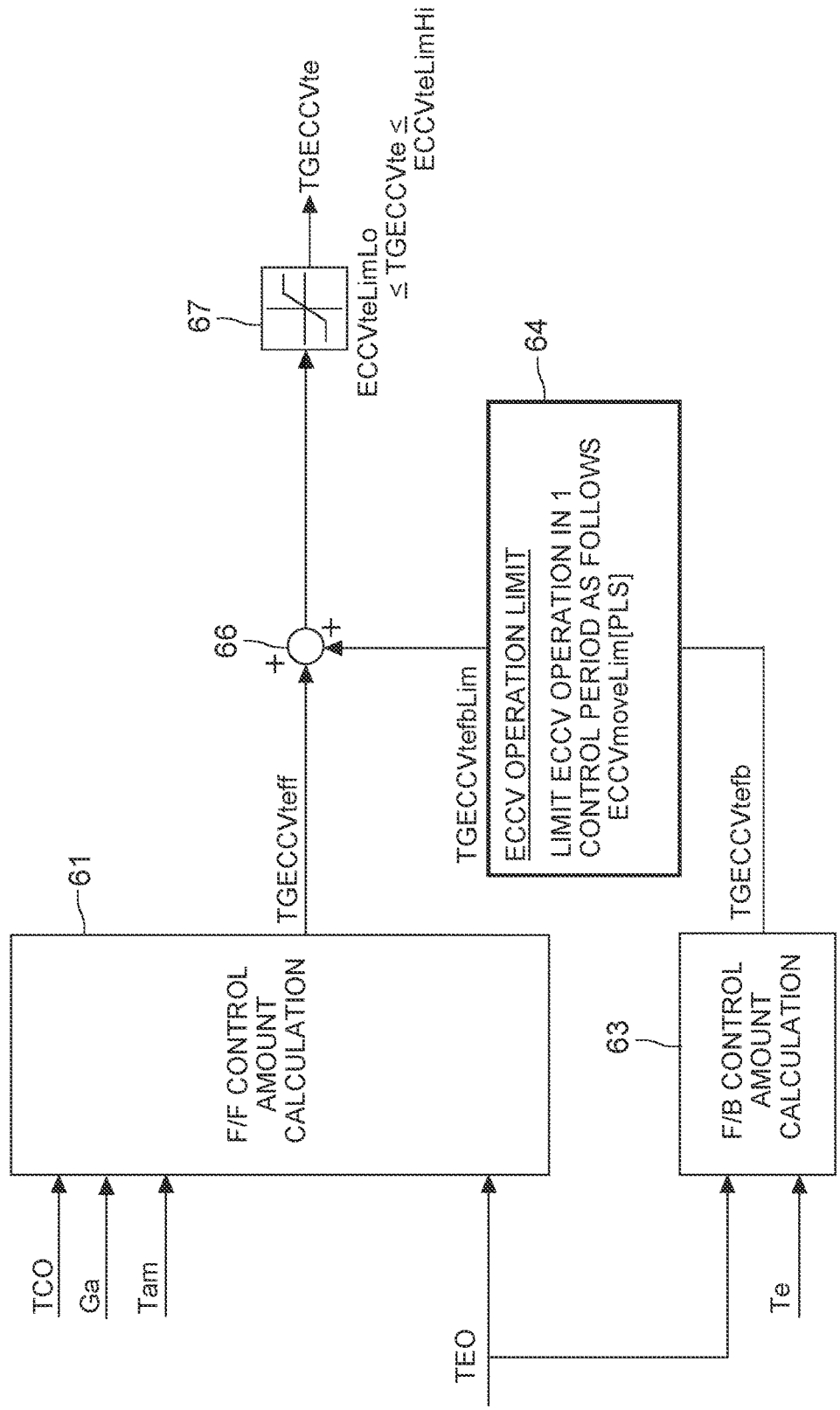
FIG. 4 is a control block diagram concerning outdoor expansion valve control in a dehumidifying and heating mode of the controller of FIG. 2.

FIG. 4 is a control block diagram of the controller 32 which determines a target position (outdoor expansion valve target position) TGECCVte of the outdoor expansion valve 6 in the dehumidifying and heating mode. In this case, the F/F control amount calculation section 61 of the controller 32 calculates an F/F control amount TGECCVteff of the outdoor expansion valve target position on the basis of a heat absorber target temperature TEO of the heat absorber 9, the radiator target temperature TCO, the mass air volume Ga, and the outdoor air temperature Tam.

Furthermore, in this case, the F/B control amount calculation section 63 calculates an F/B control amount TGECCVtefb of the outdoor expansion valve target position on the basis of the heat absorber target temperature TEO and the heat absorber temperature Te. The ECCV operation limit section 64 similarly adds an operation limit by the operation limit control of the outdoor expansion valve 6 to the F/B control amount TGECCVtefb calculated by the F/B control amount calculation section 63, and the ECCV operation limit section 64 outputs the amount as a limit F/B control amount TGECCVtefbLim in this case. Further, the F/F control amount TGECCVteff calculated by the F/F control amount calculation section 61 and the limit F/B control amount TGECCVtefbLim output from the ECCV operation limit section 64 are added by the adder 66, the limit setting section 67 attaches limits of an upper limit of controlling and a lower limit of controlling in this case, and then the outdoor expansion valve target position TGECCVte in this case is determined. In the dehumidifying and heating mode, the controller 32 controls the valve position of the outdoor expansion valve 6 on the basis of the outdoor expansion valve target position TGECCVte.

(3) Internal Cycle Mode

Next, in the internal cycle mode, the controller 32 closes the outdoor expansion valve 6 in the above state of the dehumidifying and heating mode (shut off). That is, it can be considered that this internal cycle mode is a state of shutting off the outdoor expansion valve 6 by the control of the outdoor expansion valve 6 in the dehumidifying and heating mode, and hence it is possible to capture the internal cycle mode as a part of the dehumidifying and heating mode.

However, when the outdoor expansion valve 6 closes, inflow of the refrigerant into the outdoor heat exchanger 7 is obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

Furthermore, the controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature Te of the heat absorber 9 or a high pressure PCI, to control the compressor 2.

(4) Dehumidifying and Cooling Mode

Next, in the dehumidifying and cooling mode, the controller 32 opens the solenoid valve 17 and closes the solenoid valve 21 and the solenoid valve 22. Further, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4 (the heating medium circulating circuit 40 stops), whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passing through the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R (the radiator pressure PCI), and controls a refrigerant pressure (the after-mentioned radiator pressure PCI) of the radiator 4.

Figure 5:
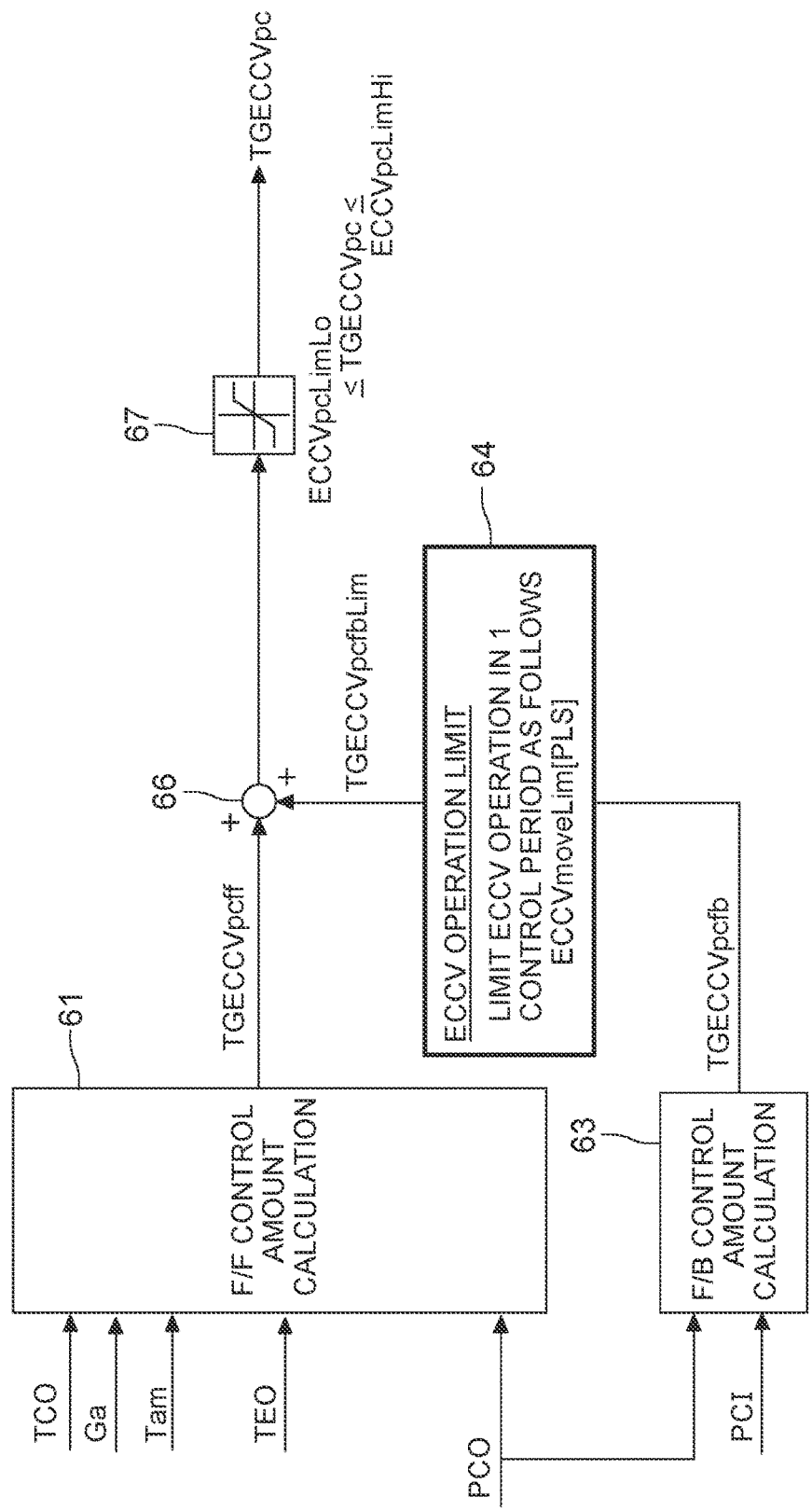
FIG. 5 is a control block diagram concerning outdoor expansion valve control in a dehumidifying and cooling mode/cooling mode of the controller of FIG. 2.

Next, FIG. 5 is a control block diagram of the controller 32 which determines a target position (an outdoor expansion valve target position) TGECCVpc of the outdoor expansion valve 6 in this dehumidifying and cooling mode. In this case, the F/F control amount calculation section 61 of the controller 32 calculates an F/F control amount TGECCVpcff of the outdoor expansion valve target position in this case on the basis of the outdoor air temperature Tam, the mass air volume Ga, the radiator target temperature TCO, a target radiator pressure PCO, and the heat absorber target temperature TEO.

Furthermore, in this case, the F/B control amount calculation section 63 calculates an F/B control amount TGECCVpcfb of the outdoor expansion valve target position on the basis of the target radiator pressure PCO and the radiator pressure PCI. The ECCV operation limit section 64 similarly adds the operation limit by the operation limit control of the outdoor expansion valve 6 to the F/B control amount TGECCVpcfb calculated by the F/B control amount calculation section 63, and the ECCV operation limit section 64 outputs the amount as a limit F/B control amount TGECCVpcfbLim in this case. Further, the F/F control amount TGECCVpcff calculated by the F/F control amount calculation section 61 and the limit F/B control amount TGECCVpcfbLim output from the ECCV operation limit section 64 are added by the adder 66, the limit setting section 67 attaches limits of an upper limit of controlling and a lower limit of controlling, and then the outdoor expansion valve target position TGECCVpc in this case is determined. In the dehumidifying and cooling mode (similarly in the after-mentioned cooling mode), the controller 32 controls the valve position of the outdoor expansion valve 6 on the basis of this outdoor expansion valve target position TGECCVpc.

(5) Cooling Mode

Next, in the cooling mode, the controller 32 fully opens the outdoor expansion valve 6 (adjusts the valve position into the upper limit of controlling) in the above state of the dehumidifying and cooling mode, and the air mix damper 28 has a state where the air does not pass through the radiator 4. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the outdoor expansion valve 6.

At this time, the outdoor expansion valve 6 is fully open, and hence the refrigerant flows into the outdoor heat exchanger 7 as it is, in which the refrigerant is cooled by the running therein or the outdoor air passing through the outdoor blower 15, to condensate and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The air blown out from the indoor blower 27 is cooled by the heat absorbing operation at this time.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature Te of the heat absorber 9 which is detected by the heat absorber temperature sensor 48. Further, the controller 32 selects each of the above operation modes and changes in accordance with the outdoor air temperature or a target outlet temperature.

(6) Operation Limit Control of Outdoor Expansion Valve 6

Figure 13:
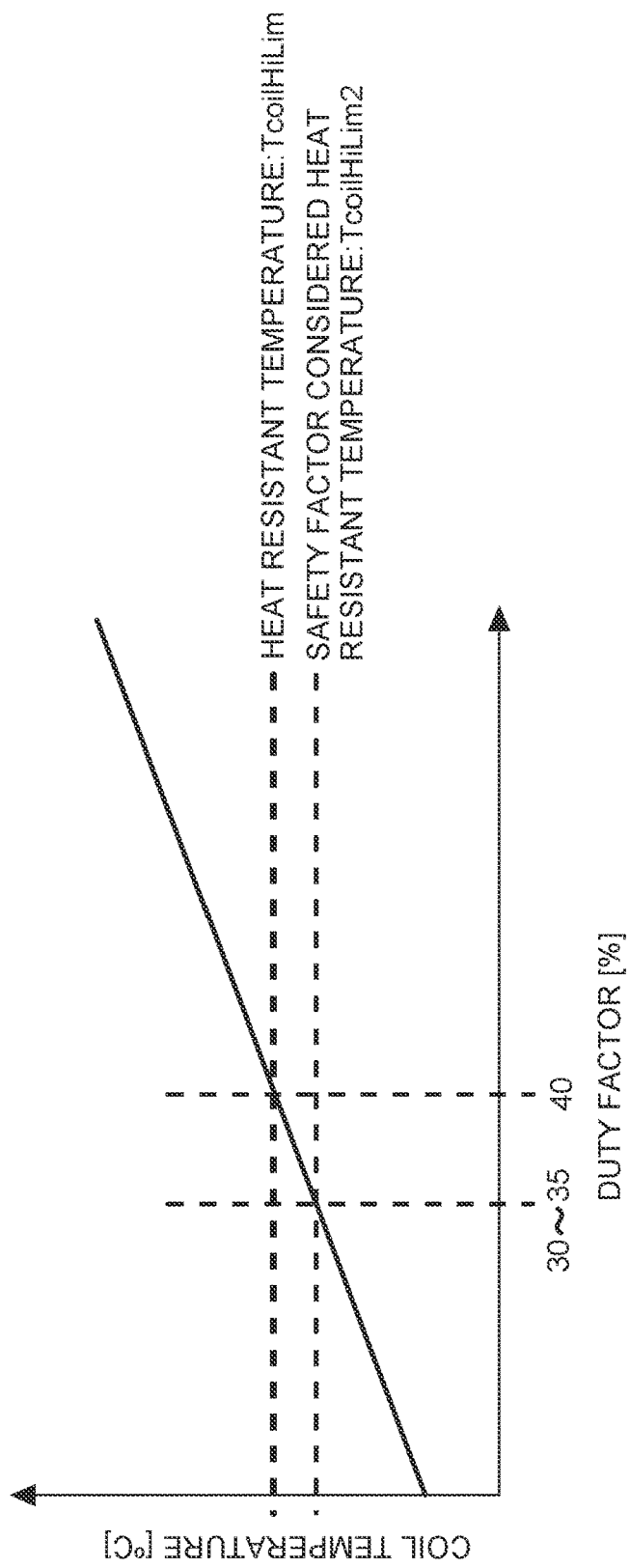
FIG. 13 is a diagram showing a relation between the duty factor of the coil of the electronic expansion valve and the temperature of the coil.

The controller 32 controls the valve position of the outdoor expansion valve 6 in each operation mode as described above. Next, the operation limit control of the outdoor expansion valve 6 by the controller 32 will be described with reference to FIG. 6 to FIG. 9 and FIG. 13. As in the case of FIG. 13 mentioned above, in a case where the heat resistant temperature TcoilHiLim of the outdoor expansion valve 6 is +150° C. and a temperature of the engine room including the outdoor expansion valve 6 (the ambient temperature of the outdoor expansion valve 6) is +120° C. at maximum, a coil temperature of the outdoor expansion valve 6 is in excess of the heat resistant temperature TcoilHiLim when the duty factor rises up to 40%.

To eliminate such a problem, in a case where a heat resistant temperature TcoilHiLim2 in which a safety factor is taken into consideration is, for example, +145° C., the coil temperature reaches the heat resistant temperature TcoilHiLim2 when the duty factor is from 30% to 35%. Therefore, it is seen that the duty factor to the coil of the outdoor expansion valve 6 has to be suppressed between 30% and 35% to avoid damages due to self-heating of the coil of the outdoor expansion valve 6.

Figure 6:
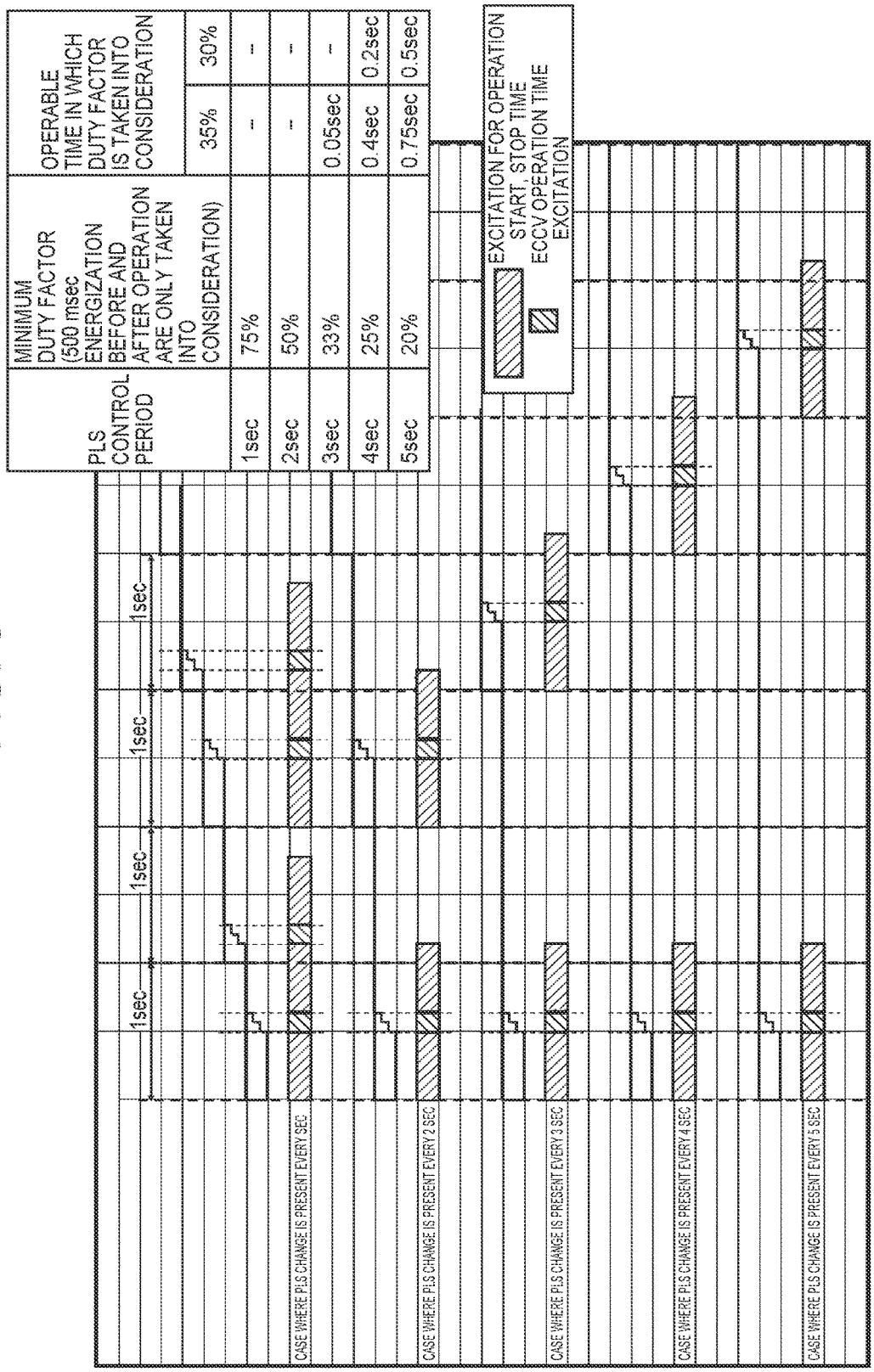
FIG. 6 is a diagram showing a relation between a duty factor of the outdoor expansion valve of FIG. 1 and an operable time.

On the other hand, a usual electronic expansion valve requires energization (excitation) of 500 msec before and after the operation, to hold its position (a current pulse number or the position). FIG. 6 shows its behavior. An uppermost row of this drawing shows a case where a control period of the electronic expansion valve is 1 sec, a second row from the top shows a case of 2 sec, a third row shows a case of 3 sec, a fourth row shows a case of 4 sec, and a lowermost row shows a case of 5 sec. A minimum duty factor only of the energization (the excitation) of 500 sec before and after the operation is 75% in the case where the control period is 1 sec, 50% in the case of 2 sec, 33% (actually 33.33%) in the case of 3 sec, 25% in the case of 4 sec, and 20% in the case of 5 sec.

Therefore, in a case of suppressing the duty factor to 35%, it is not possible to perform the energization (the excitation) for the electronic expansion valve operation in the control period of 1 sec or 2 sec, and operable time is 0.05 sec ((35%−33.33%)×3 sec) in the control period of 3 sec, 0.4 sec in the control period of 4 sec, and 0.75 sec in the control period of 5 sec. Furthermore, in a case of suppressing the duty factor to 30%, it is not possible to perform the energization (the excitation) for the electronic expansion valve operation in the control period of 1 sec, 2 sec or 3 sec, and the operable time is 0.2 sec in the control period of 4 sec, and 0.5 sec in the control period of 5 sec.

On the other hand, 1 pulse (PLS) to operate the usual electronic expansion valve is 1000/90 msec (11.11 msec), and hence a maximum pulse number per operation to suppress the duty factor to 35% or less is 4.5 pulses (0.05/0.01111) in the case of the control period of 3 sec, 36 pulses in the case of 4 sec, and 67.5 pulses in the case of 5 sec as shown in FIG. 7. Furthermore, the maximum pulse number to suppress the duty factor to 30% or less is 18 pulses (0.2/0.01111) in the case of the control period of 4 sec, and 45 pulses in the case of 5 sec.

To eliminate such a problem, in the following embodiment, the control period in usual control of the outdoor expansion valve 6 is defined as 1 sec and the maximum pulse number per operation is defined as 500 pulses (no limit), whereas the control period in the operation limit control of the outdoor expansion valve 6 is longer, i.e., 4 sec and the maximum pulse number per operation is limited to 36 pulses (a limit value) when the duty factor is 35%. That is, in the embodiment, during the operation limit control of the outdoor expansion valve 6, the controller 32 extends the control period of the outdoor expansion valve 6 to 4 sec, and suppresses (limits) its operation amount within 36 pulses (the limit value) at maximum, thereby limiting (decreasing) the duty factor of the outdoor expansion valve 6 to 35% or less, to execute control so that the temperature of the coil of the outdoor expansion valve 6 is not in excess of the heat resistant temperature TcoilHiLim2 (a predetermined value) in which the safety factor is taken into consideration.

(7) One Example of Actual Operation Limit Control of Outdoor Expansion Valve 6

Figure 8:
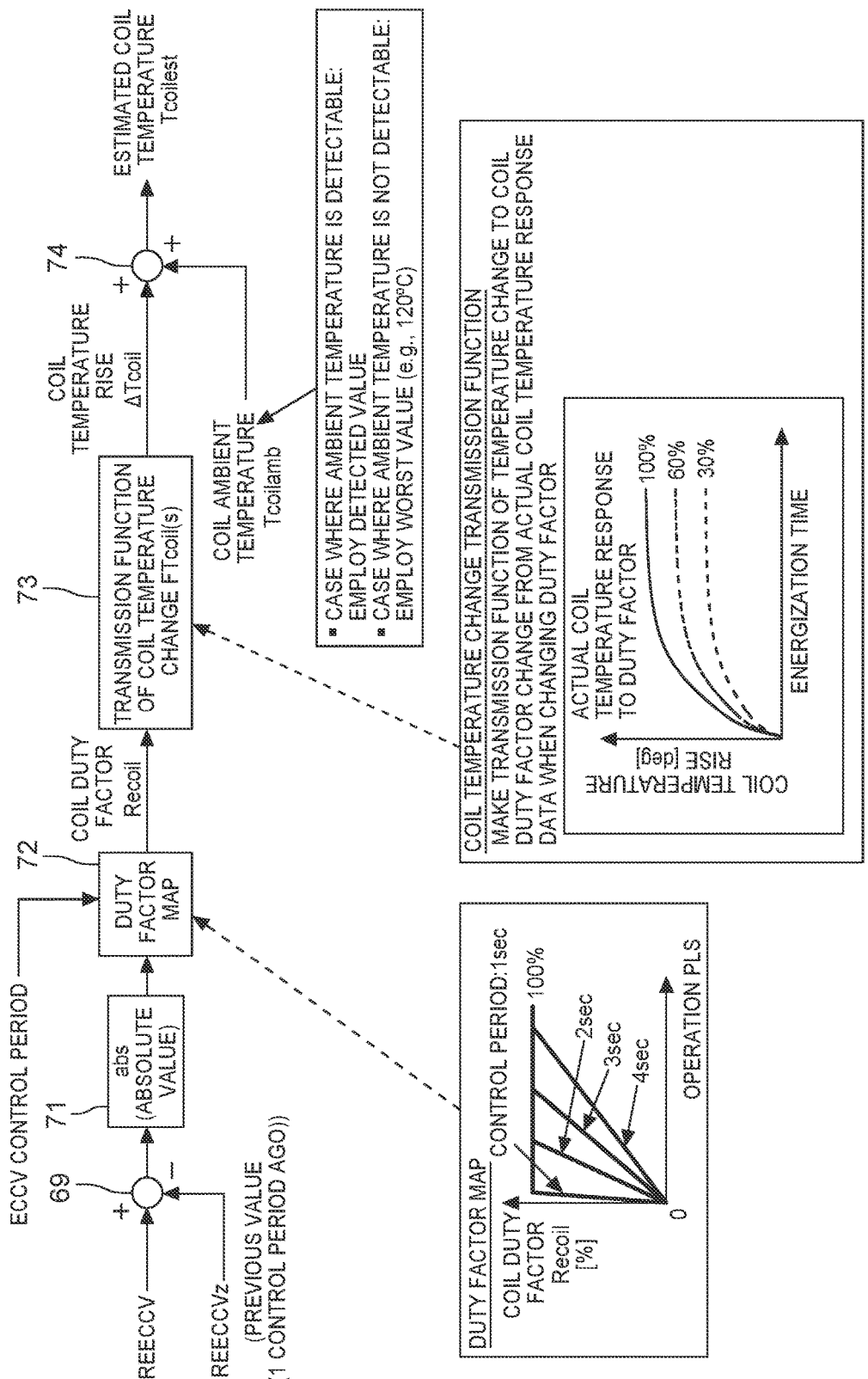
FIG. 8 is a control block diagram concerning coil temperature estimation of the outdoor expansion valve of the controller of FIG. 2.
Figure 9:
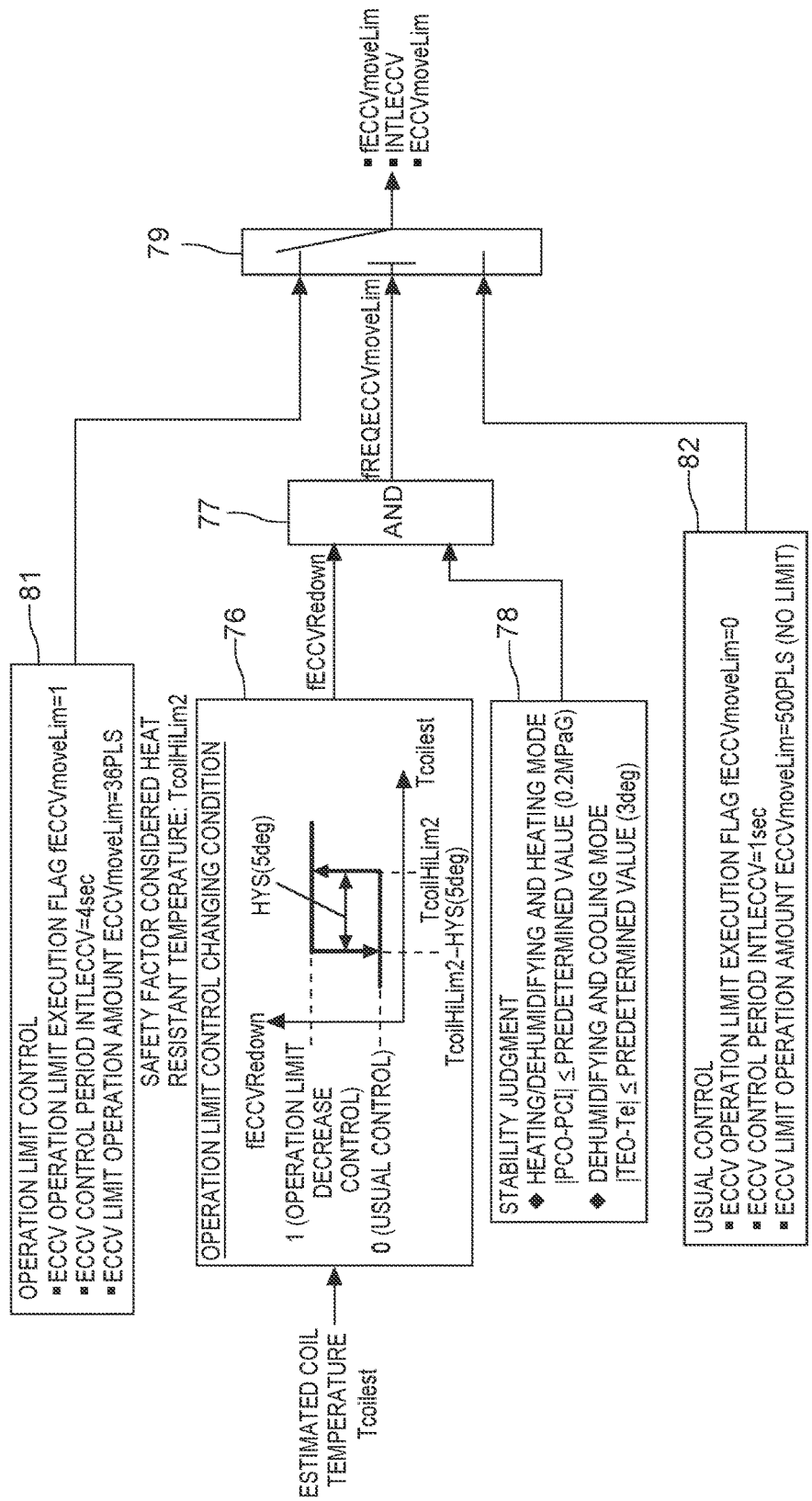
FIG. 9 is a control block diagram concerning operation limit control of the controller of FIG. 2 (Embodiment 1)

Next, one example of the operation limit control of the outdoor expansion valve 6 to be executed by the ECCV operation limit section 64 of the controller 32 will be described with reference to FIG. 8 and FIG. 9. In this example, the controller estimates the temperature of the coil of the outdoor expansion valve 6 to execute the operation limit control. FIG. 8 is a control block diagram of the controller 32 concerning coil temperature estimation of the outdoor expansion valve 6, and FIG. 9 is a control block diagram concerning the operation limit control using the estimation. In FIG. 8, the controller 32 subtracts a previous value (a position of 1 control period ago) from a current position of the outdoor expansion valve 6 (a current pulse number or the position) with a subtracter 69, thereby calculating an operation amount of this time (a change of the pulse), and inputs this amount into an absolute value calculation section 71 to calculate an absolute value of the operation amount.

Next, a duty factor map section 72 calculates the duty factor of this time to the coil of the outdoor expansion valve 6 (a coil duty factor Recoil) from a relation between the operation amount (the pulse) and the duty factor of the coil in the control period of 1 sec to 4 sec (shown in the lower left of the drawing). Next, a transmission function section 73 of a coil temperature change calculates a temperature rise of the coil (a coil temperature rise ΔTcoil) from the coil duty factor Recoil. The transmission function section 73 of the coil temperature change integrates the temperature rises from the beginning of operation start to calculate the coil temperature rise ΔTcoil from a relation between energization time to the coil and a coil temperature rise in each duty factor (100%, 60%, 30%, etc.) (a coil temperature response shown in the lower middle of the drawing).

Next, an adder 74 adds, to the coil temperature rise ΔTcoil, the ambient temperature of the outdoor expansion valve 6 which is detected by the engine room temperature sensor 34 (a coil ambient temperature Tcoilamb), thereby calculating an estimated coil temperature Tcoilest. That is, the controller 32 obtains the duty factor (an energizing situation to the coil of the outdoor expansion valve 6) from the operation amount of the outdoor expansion valve 6 of this time, and integrates the temperature rises from the beginning of the operation start by use of a transmission function to calculate the rise of the coil temperature up to current time from the duty factor, and adds the ambient temperature thereto, thereby estimating the current temperature of the coil of the outdoor expansion valve 6 (Tcoilest).

It is to be noted that in the present embodiment, the controller detects the coil ambient temperature of the outdoor expansion valve 6 by use of the engine room temperature sensor 34, but in a case where such a temperature sensor cannot be disposed, the adder 74 adds a worst value presumed in the engine room, i.e., the highest temperature (e.g., +120° C.) to the coil temperature rise ΔTcoil to calculate the estimated coil temperature Tcoilest.

Next, the controller 32 judges the execution and cancellation of the operation limit control of the outdoor expansion valve 6 as in a block diagram of FIG. 9, on the basis of the estimated coil temperature Tcoilest of the outdoor expansion valve 6 which is estimated. First, in a case where the estimated coil temperature Tcoilest of the outdoor expansion valve 6 rises to the heat resistant temperature TcoilHiLim2 (the predetermined value), the controller 32 sets an outdoor expansion valve operation limit flag fECCVRedown to "1" with an operation limit control changing condition section 76 of FIG. 9. Furthermore, the operation limit control changing condition section 76 resets the outdoor expansion valve operation limit flag fECCVRedown to "0" in a case where the estimated coil temperature Tcoilest of the outdoor expansion valve 6 lowers to a value (TcoilHiLim2-HYS) which is lower than the heat resistant temperature TcoilHiLim2 as much as predetermined hysteresis HYS (e.g., 5 deg). Further, the controller inputs the outdoor expansion valve operation limit flag fECCVRedown into an AND gate 77.

An output of a stability judgment section 78 is also input into the AND gate 77. The stability judgment section 78 outputs "1" in a case where an absolute value of a difference (PCO−PCI) between the target radiator pressure PCO and the radiator pressure PCI is not more than a predetermined value (e.g., 0.2 MPaG) in the heating/dehumidifying and heating mode, and in a case where an absolute value of a difference (TEO-Te) between the heat absorber target temperature TEO and the heat absorber temperature Te is not more than a predetermined value (e.g., 3 deg) in the dehumidifying and cooling mode, and the stability judgment section outputs "0" in another case. That is, when an operating state of the vehicle air conditioner 1 is a stable state in each mode, the stability judgment section 78 outputs "1", and in a transitional stage (an operation start initial stage, a time when setting is changed, or the like), the stability judgment section outputs "0".

Furthermore, an output of the AND gate 77 is input as an outdoor expansion valve operation limit control requirement flag fREQECCVmoveLim into a changing section 79. That is, only in a case where the outdoor expansion valve operation limit flag fECCVRedown is "1" and the output of the stability judgment section 78 is "1", the outdoor expansion valve operation limit control requirement flag fREQECCVmoveLim becomes "1", and on the other conditions, the flag becomes "0".

In the changing section 79, there are input a condition storage section 81 of an operation limit control time and a condition storage section 82 of a usual control time. When the outdoor expansion valve operation limit control requirement flag fREQECCVmoveLim is "1", control conditions of the condition storage section 81 are selected, and when the flag is "0", control conditions of the condition storage section 82 are selected, and output from the changing section 79. The condition storage section 81 of the operation limit control time stores the control conditions of an outdoor expansion valve operation limit execution flag fECCBmoveLim=1, an outdoor expansion valve control period INTLECCV=4 sec, and an outdoor expansion valve limit value ECCVmoveLim=36 pulses, and the condition storage section 82 of the usual control time stores the control conditions of the outdoor expansion valve operation limit execution flag fECCBmoveLim=0, the outdoor expansion valve control period INTLECCV=1 sec, and the outdoor expansion valve limit value ECCVmoveLim=500 pulses (no limit).

That is, in this embodiment, when the operating state of the vehicle air conditioner 1 is the transitional stage or in a case where the estimated coil temperature Tcoilest of the outdoor expansion valve 6 is lower than the heat resistant temperature TcoilHiLim2, the controller 32 executes the usual control to set the control period of the outdoor expansion valve 6 to 1 sec and to set a maximum operation amount to 500 pulses (no limit).

On the other hand, when the operating state of the vehicle air conditioner 1 is the stable state and in a case where the estimated coil temperature Tcoilest of the outdoor expansion valve 6 rises up to the heat resistant temperature TcoilHiLim2, the controller 32 executes the operation limit control to lengthen the control period of the outdoor expansion valve 6 to 4 sec and to also suppress the maximum operation amount within a limit value of 36 pulses. The ECCV operation limit section 64 mentioned above outputs the limit F/B control amount TGECCVscfbLim to which the operation limit by the operation limit control of the outdoor expansion valve 6 is added. Consequently, the duty factor to the coil of the outdoor expansion valve 6 is suppressed to 35% or less (not more than the predetermined value), and the temperature of the coil is controlled to be not in excess of the heat resistant temperature TcoilHiLim2 (the predetermined value).

In this way, the controller 32 executes the operation limit control to limit the operation of the outdoor expansion valve 6 so that the temperature of the coil of the outdoor expansion valve 6 is not in excess of the predetermined value (the heat resistant temperature TcoilHiLim2), and hence it is possible to avoid, in advance, the disadvantage that the temperature of the coil of the outdoor expansion valve 6 is in excess of the heat resistant temperature (TcoilHiLim) due to the self-heating occurred by the energization and it is possible to achieve improvement of durability.

In particular, the outdoor expansion valve 6 for use in the vehicle air conditioner 1 in which use environment becomes worst produces a remarkable effect. Furthermore, it is not necessary to change to an electronic expansion valve having a high heat resistance, and it is also possible to prevent the disadvantage that production cost soars.

In this case, the controller 32 lengthens the control period of the outdoor expansion valve 6 and suppresses the operation amount of the outdoor expansion valve 6 within the predetermined limit value to limit the duty factor in the operation limit control, so that it is possible to accurately and effectively inhibit rise of the coil temperature of the outdoor expansion valve 6. In the case of this embodiment, the controller 32 executes the operation limit control in a case where the temperature of the coil of the outdoor expansion valve 6 rises to the predetermined value (the heat resistant temperature TcoilHiLim2), and hence it is possible to securely avoid the disadvantage that the temperature of the coil is in excess of the heat resistant temperature (TcoilHiLim).

At this time, the controller 32 estimates the temperature of the coil (Tcoilest) on the basis of an energizing situation to the coil of the outdoor expansion valve 6, and the ambient temperature of the outdoor expansion valve 6 or the highest temperature presumed at the ambient temperature, and hence it is possible to estimate, as the temperature of the coil, a temperature obtained by adding a self-heating level to the ambient temperature in a case where the ambient temperature of the outdoor expansion valve 6 is detectable. On the other hand, in a case where the ambient temperature is not detectable, it is possible to estimate, as the temperature of the coil, a temperature obtained by adding the self-heating level to the highest temperature presumed as the ambient temperature, and in any case, it is possible to achieve protection of the outdoor expansion valve 6 and to improve its durability without disposing any special sensor to detect the coil temperature of the outdoor expansion valve 6.

Furthermore, the controller 32 does not execute the operation limit control in the transitional stage of the operating state of the vehicle air conditioner 1, and hence it is possible to rapidly operate the outdoor expansion valve 6 in a transitional stage such as the operation start initial stage or a time when setting is changed, and it is possible to secure control properties. Furthermore, in the control block diagrams of FIG. 3 to FIG. 5, the ECCV operation limit section 64 adds the operation limit only to the F/B control amount of the outdoor expansion valve target position output from the F/B control amount calculation section 63. This is because the operation limit does not have to be added to the F/F control amount of the F/F control amount calculation section 61 which changes at a time of condition change or setting change, for reasons similar to the above reasons.

Embodiment 2

(8) Another Example of Actual Operation Limit Control of Outdoor Expansion Valve 6

Figure 10:
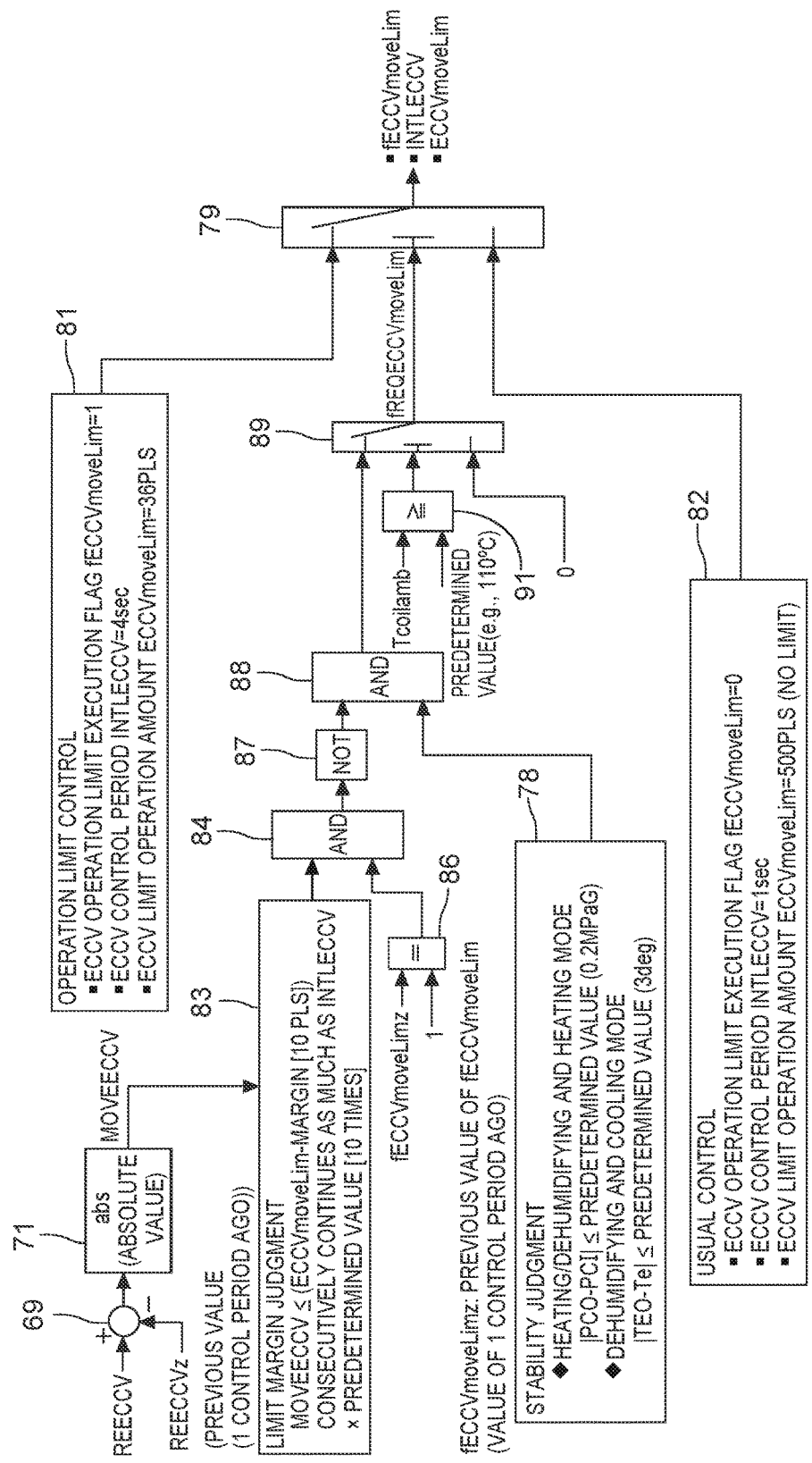
FIG. 10 is a control block diagram of another embodiment concerning the operation limit control of the controller of FIG. 2 (Embodiment 2)

Next, another embodiment of operation limit control of an outdoor expansion valve 6 which is executed by an ECCV operation limit section 64 of a controller 32 will be described with reference to FIG. 10. In this embodiment, the controller cancels the operation limit control in a case where an operation amount of the outdoor expansion valve 6 has a margin to a limit value. FIG. 10 is a control block diagram concerning the operation limit control in this case. It is to be noted that in this drawing, components denoted with the same reference numerals as those in FIG. 8 and FIG. 9 of the above embodiment perform the same or similar functions.

In FIG. 10, the controller 32 subtracts a previous value (a position of 1 control period ago) from a current position of the outdoor expansion valve 6 (a current pulse number or the position) with a subtracter 69, thereby calculating an operation amount of this time (a change of the pulse), and inputs this amount into an absolute value calculation section 71 to calculate an absolute value MOVEECCV of the operation amount. Next, the controller 32 compares the calculated absolute value MOVEECCV of the operation amount with an outdoor expansion valve limit value ECCVmoveLim–the margin (e.g., 10 pulses) in a control margin judgment section 83, and the controller judges whether or not a situation in which the absolute value MOVEECCV of the operation amount≤(the outdoor expansion valve limit value ECCVmoveLim–the margin) consecutively continues as much as an outdoor expansion valve control period INTLECCV×a predetermined value (e.g., 10 times).

Further, in the case where a situation in which the absolute value MOVEECCV of the operation amount is not more than a value smaller than the outdoor expansion valve limit value ECCVmoveLim as much as the margin consecutively continues as much as the predetermined times (10 times) of the outdoor expansion valve control period INTLECCV, the control margin judgment section 83 judges that the operation amount of the outdoor expansion valve 6 sufficiently has the margin to the limit value, and outputs and inputs "1" into an AND gate 84. An output of a comparator 86 is also input into the AND gate 84. In the comparator 86, there are input an electronic expansion valve operation limit execution flag fECCVmoveLimz of 1 period ago and "1", and in a case where the electronic expansion valve operation limit execution flag fECCVmoveLimz of 1 period ago is "1", the comparator outputs "1".

Further, an output of the AND gate 84 is input into a NOT gate 87, and an output of the NOT gate 87 is input into an AND gate 88. An output of a stability judgment section 78 mentioned above is also input into the AND gate 88, and an output of the AND gate 88 is input into a changing section 89. The changing section 89 changes in accordance with an output of a comparator 91 whether to output the output of the AND gate 88 as an outdoor expansion valve operation limit control requirement flag fREQECCVmoveLim, or to output "0" as the outdoor expansion valve operation limit control requirement flag fREQECCVmoveLim. Further, an output of a changing section 79 can change in accordance with an output of the changing section 89 similarly to the above embodiment.

In the comparator 91, there are input a coil ambient temperature Tcoilamb and a predetermined value (e.g., +110° C.) In a case where the coil ambient temperature Tcoilamb rises to a predetermined value (+110° C.) or more, its output becomes "1" and the output of the gate 88 is selected, and when the output of the comparator 91 is "0", "0" is selected.

That is, in this embodiment, when an operating state of a vehicle air conditioner 1 is a transitional stage or in a case where the coil ambient temperature Tcoilamb of the outdoor expansion valve 6 is lower than the predetermined value (+110° C.), the controller 32 executes usual control to set a control period of the outdoor expansion valve 6 to 1 sec and to set a maximum operation amount to 500 pulses (no limit).

On the other hand, when the operating state of the vehicle air conditioner 1 is a stable state and in a case where the coil ambient temperature Tcoilamb of the outdoor expansion valve 6 rises to the predetermined value (+110° C.) or more, the controller 32 executes the operation limit control to lengthen the control period of the outdoor expansion valve 6 to 4 sec and to also suppress the maximum operation amount within a limit value of 36 pulses. The ECCV operation limit section 64 mentioned above outputs a limit F/B control amount TGECCVscfbLim to which an operation limit by the operation limit control of the outdoor expansion valve 6 is added. Consequently, a duty factor to a coil of the outdoor expansion valve 6 is suppressed to 35% or less (not more than the predetermined value), and a temperature of the coil is controlled to be not in excess of a heat resistant temperature TcoilHiLim2 (a predetermined value).

On the other hand, when the controller executes this operation limit control, i.e., when the electronic expansion valve operation limit execution flag fECCVmoveLimz of 1 period ago is "1", the control margin judgment section 83 judges that the operation amount of the outdoor expansion valve 6 sufficiently has the margin to the limit value, and in this case, even when the coil ambient temperature Tcoilamb of the outdoor expansion valve 6 is not less than the predetermined value (+110° C.), the controller resets the outdoor expansion valve operation limit control requirement flag fREQECCVmoveLim ("0"), and cancels the operation limit control to return to the usual control.

Thus, in this embodiment, the controller 32 cancels the operation limit control in the case where the operation amount of the outdoor expansion valve 6 has the margin to the limit value, when the controller executes the operation limit control of the outdoor expansion valve 6. Therefore, when the operation amount of the outdoor expansion valve 6 sufficiently has the margin to the limit value during the operation limit control, the controller cancels the operation limit control to avoid unnecessary operation limit, and it is possible to minimize deterioration of response properties of the outdoor expansion valve 6.

It is to be noted that in this embodiment, in the case where the operation amount of the outdoor expansion valve 6 has the margin to the limit value, the controller cancels the operation limit control, but the present invention is not limited to this embodiment, and the controller may enlarge the limit value (ECCVmoveLim) of the outdoor expansion valve 6 in the operation limit control to a value (e.g., 72 pulses or the like) larger than 36 pulses.

Embodiment 3

(9) Still Another Example of Actual Operation Limit Control of Outdoor Expansion Valve 6

Figure 11:
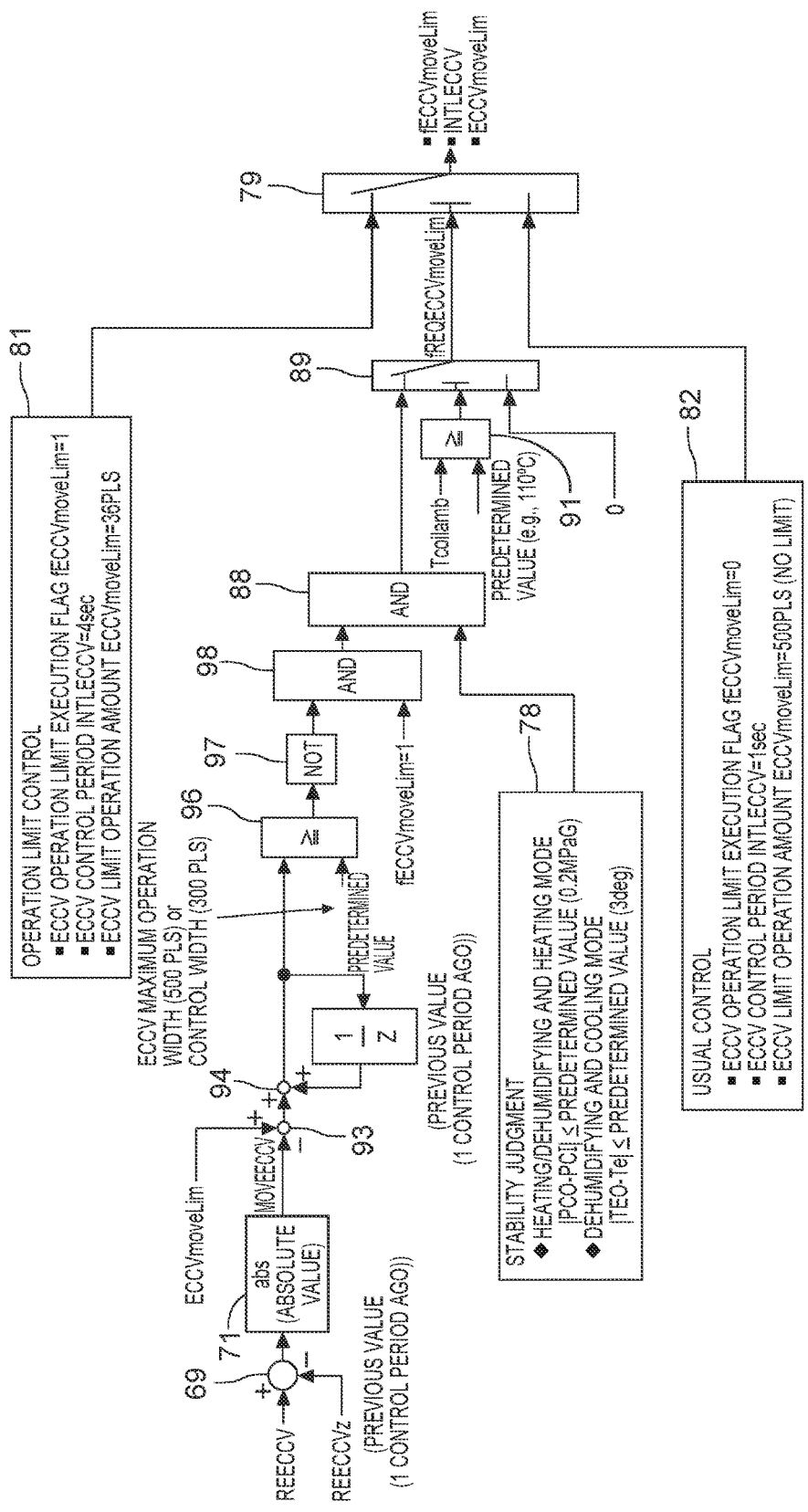
FIG. 11 is a control block diagram of still another embodiment concerning the operation limit control of the controller of FIG. 2 (Embodiment 3)

Next, still another embodiment of operation limit control of an outdoor expansion valve 6 which is executed by an ECCV operation limit section 64 of a controller 32 will be described with reference to FIG. 11. In this embodiment, the controller cancels the operation limit control in a case where an integrated value of a difference between a limit value and an operation amount of the outdoor expansion valve 6 enlarges. FIG. 11 is a control block diagram concerning the operation limit control in this case. It is to be noted that in this drawing, components denoted with the same reference numerals as those in FIG. 8 to FIG. 10 of the above embodiments perform the same or similar functions.

In FIG. 11, the controller 32 subtracts a previous value (a position of 1 control period ago) from a current position of the outdoor expansion valve 6 (a current pulse number or the position) with a subtracter 69, thereby calculating an operation amount of this time (a change of the pulse), and inputs this amount into an absolute value calculation section 71 to calculate an absolute value MOVEECCV of the operation amount. Next, the controller 32 calculates a difference (ECCVmoveLim−MOVEECCV) between an outdoor expansion valve limit value ECCVmoveLim and the calculated absolute value MOVEECCV of the operation amount with a subtracter 93, and an adder 94 adds a previous value (the value of 1 control period ago: 1/Z) to this difference (ECCVmoveLim−MOVEECCV), thereby integrating the difference (ECCVmoveLim−MOVEECCV).

Further, a comparator 96 compares an integrated value of this difference with a predetermined value (a maximum operation width of 500 pulses of the outdoor expansion valve 6 or a control width of 300 pulses). Further, the comparator 96 outputs "1" in a case where the integrated value is not less than a predetermined value, and outputs "0" in a case where the integrated value is smaller. This output of the comparator 96 is input into a NOT gate 97, and an output of the NOT gate 97 is input into an AND gate 98. Further into the AND gate 98, there is also input an outdoor expansion valve operation limit execution flag fECCVmoveLim="1".

Further, an output of the AND gate 98 is input into an AND gate 88. Also into the AND gate 88, the abovementioned output of the stability judgment section 78 is also input, and an output of the AND gate 88 is input into a changing section 89. The changing section 89 changes in accordance with an output of a comparator 91 whether to output the output of the AND gate 88 as an outdoor expansion valve operation limit control requirement flag fREQECCVmoveLim, or to output "0" as the outdoor expansion valve operation limit control requirement flag fREQECCVmoveLim. Further, an output of a changing section 79 can change in accordance with an output of the changing section 89 similarly to the above embodiment.

In the comparator 91, there are similarly input a coil ambient temperature Tcoilamb and a predetermined value (e.g., +110° C.) as described above. In a case where the coil ambient temperature Tcoilamb rises to a predetermined value (+110° C.) or more, its output becomes "1" and the output of the gate 88 is selected, and when the output of the comparator 91 is "0", "0" is selected.

That is, also in this embodiment, when an operating state of a vehicle air conditioner 1 is a transitional stage or in a case where the coil ambient temperature Tcoilamb of the outdoor expansion valve 6 is lower than the predetermined value (+110° C.), the controller 32 executes usual control to set a control period of the outdoor expansion valve 6 to 1 sec and to set a maximum operation amount to 500 pulses (no limit).

Furthermore, when the operating state of the vehicle air conditioner 1 is similarly a stable state and in a case where the coil ambient temperature Tcoilamb of the outdoor expansion valve 6 rises to the predetermined value (+110° C.) or more, the controller 32 executes the operation limit control to lengthen the control period of the outdoor expansion valve 6 to 4 sec and to also suppress the maximum operation amount within a limit value of 36 pulses. The ECCV operation limit section 64 mentioned above outputs a limit F/B control amount TGECCVscfbLim to which an operation limit by the operation limit control of the outdoor expansion valve 6 is added. Consequently, a duty factor to a coil of the outdoor expansion valve 6 is suppressed to 35% or less (not more than the predetermined value), and a temperature of the coil is controlled to be not in excess of a heat resistant temperature TcoilHiLim2 (a predetermined value).

On the other hand, when the controller executes this operation limit control, i.e., when the electronic expansion valve operation limit execution flag fECCVmoveLim is "1", in a case where an integrated value of the difference (ECCVmoveLim−MOVEECCV) between the absolute value MOVEECCV of the operation amount of the outdoor expansion valve 6 and the outdoor expansion valve limit value ECCVmoveLim enlarges to a predetermined value (e.g., the above maximum operation width) or more, the output of the NOT gate 97 becomes "0". Therefore, even when the coil ambient temperature Tcoilamb of the outdoor expansion valve 6 is not less than the predetermined value (+110° C.), the controller resets ("0") the outdoor expansion valve operation limit control requirement flag fREQECCVmoveLim, and cancels the operation limit control to return to the usual control.

Thus, also in this embodiment, when the controller 32 executes the operation limit control of the outdoor expansion valve 6, the controller integrates the difference between the operation amount of the outdoor expansion valve 6 and the limit value, and in a case where the integrated value enlarges, the controller cancels the operation limit control. Therefore, when the operation amount of the outdoor expansion valve 6 is sufficiently smaller than the limit value during the operation limit control, the controller cancels the operation limit control to avoid unnecessary operation limit, and it is possible to minimize deterioration of response properties.

It is to be noted that also in this embodiment, in the case where the integrated value of the difference between the operation amount of the outdoor expansion valve 6 and the limit value enlarges, the controller cancels the operation limit control, but the present invention is not limited to this embodiment, and the controller may enlarge the limit value (ECCVmoveLim) of the outdoor expansion valve 6 in the operation limit control to a value (e.g., 72 pulses or the like) larger than 36 pulses.

Embodiment 4

(10) Further Example of Actual Operation Limit Control of Outdoor Expansion Valve 6

Figure 12:
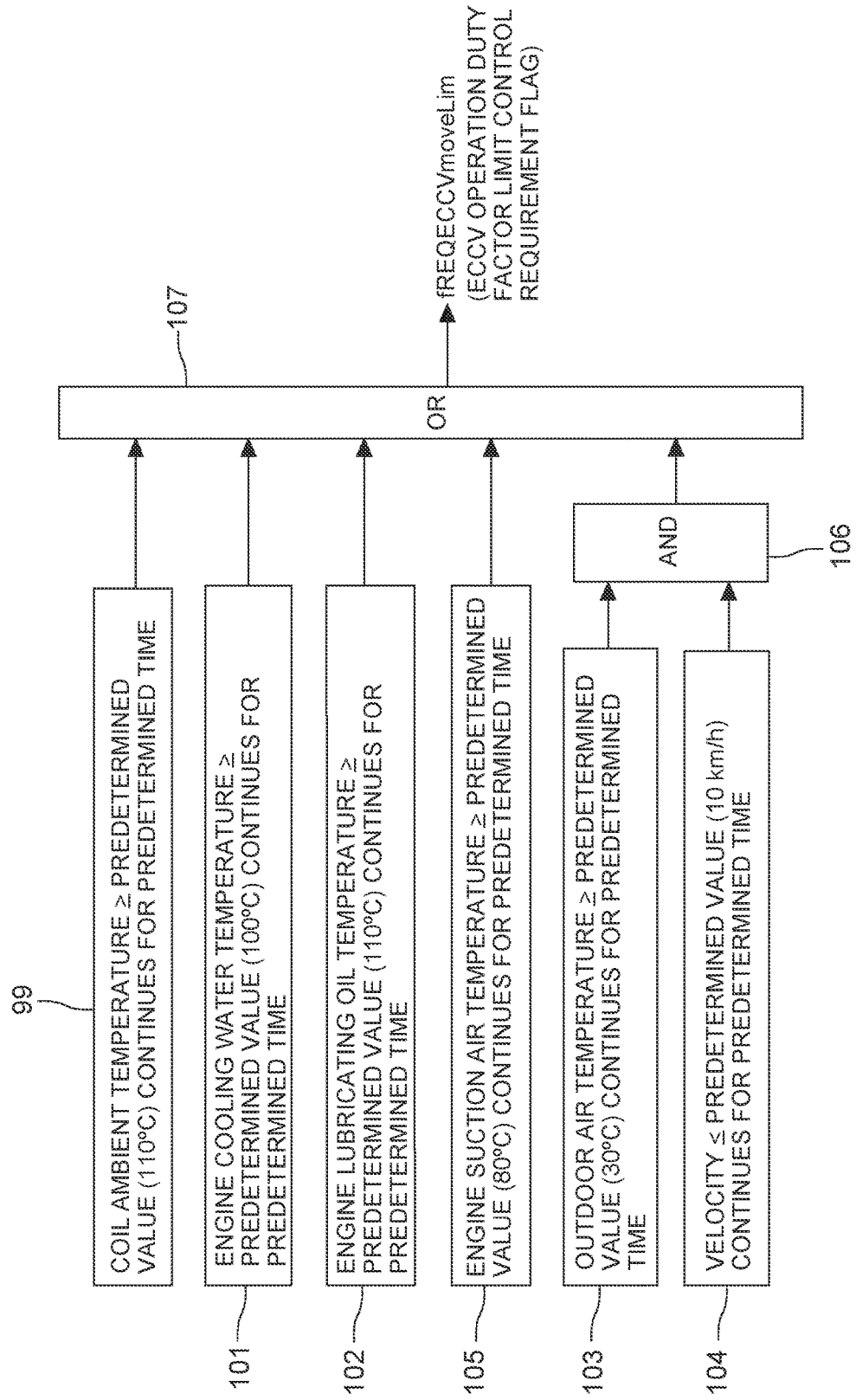
FIG. 12 is a control block diagram of a further embodiment concerning the operation limit control of the controller of FIG. 2 (Embodiment 4)

Next, a further embodiment of operation limit control of an outdoor expansion valve 6 which is executed by an ECCV operation limit section 64 of a controller 32 will be described with reference to FIG. 12. In this embodiment, 99 is a coil ambient temperature judgment section, the section judges whether or not a state where a coil ambient temperature Tcoilamb of a coil of the outdoor expansion valve 6 which is detected by an engine room temperature sensor 34 is not less than a predetermined value (e.g., +110° C.) continues for a predetermined time, and the section outputs "1" in a case where such a condition is established.

101 and 102, and 105 show a case of a usual car or a hybrid car having an engine, 101 is an engine cooling water temperature judgment section, 102 is an engine lubricating oil temperature judgment section, and 105 is an engine suction air temperature judgment section. The engine cooling water temperature judgment section 101 judges whether or not a state where an engine cooling water temperature is not less than a predetermined value (e.g., +100° C.) continues for a predetermined time, and outputs "1" in a case where such a condition is established. Furthermore, the engine lubricating oil temperature judgment section 102 judges whether or not a state where an engine lubricating oil temperature is not less than a predetermined value (e.g., +110° C.) continues for a predetermined time, and outputs "1" in a case where such a condition is established. Furthermore, the engine suction air temperature judgment section 105 judges whether or not a state where an engine suction air temperature is not less than a predetermined time (e.g., +80° C.) continues for a predetermined time, and outputs "1" in a case where such a condition is established.

103 is an outdoor air temperature judgment section, 104 is a velocity judgment section, and their outputs are input into an AND gate 106. The outdoor air temperature judgment section 103 judges whether or not a state where an outdoor air temperature Tam detected by an outdoor air temperature sensor 33 is not less than a predetermined value (e.g., +30° C.) continues for a predetermined time, and outputs "1" in a case where such a condition is established. The velocity judgment section 104 judges whether or not a state where a velocity detected by a velocity sensor 52 is not more than a predetermined value (e.g., 10 km/h) continues for a predetermined time, and outputs "1" in a case where such a condition is established.

Further, the outputs of the coil ambient temperature judgment section 99, the engine cooling water temperature judgment section 101, the engine lubricating oil temperature judgment section 102, the engine suction air temperature judgment section 105 and the AND gate 106 are input into an OR gate 107, and an output of the OR gate 107 is output as the above-mentioned outdoor expansion valve operation limit control requirement flag fREQECCVmoveLim. Further, this output (the outdoor expansion valve operation limit control requirement flag fREQECCVmoveLim) of the OR gate 107 is similarly input into a changing section 79 as described above.

That is, in a case where there is established one of the condition that the state where the coil ambient temperature Tcoilamb is not less than the predetermined value (+110° C.) continues for the predetermined time, the condition that the state where the engine cooling water temperature is not less than the predetermined value (+100° C.) continues for the predetermined time, the condition that the state where the engine lubricating oil temperature is not less than the predetermined value (+110° C.) continues for the predetermined time, the condition that the state where the engine suction air temperature is not less than the predetermined value (+80° C.) continues for the predetermined time, and the condition that the state where the outdoor air temperature Tam is not less than the predetermined value (+30° C.) continues for the predetermined time and that the state where the velocity is not more than the predetermined value (10 km/h) continues for the predetermined time, or in a case where any combination of the conditions is established, or in a case where all of the conditions is established, the outdoor expansion valve operation limit control requirement flag fREQECCVmoveLim which is the output of the OR gate 107 becomes "1", and in another case, the flag becomes "0".

Also in the case of this embodiment, in the changing section 79, there are input a condition storage section 81 of an operation limit control time and a condition storage section 82 of a usual control time. When the outdoor expansion valve operation limit control requirement flag fREQECCVmoveLim is "1", control conditions of the condition storage section 81 are selected, and when the flag is "0", control conditions of the condition storage section 82 are selected, and the conditions are output from the changing section 79. Therefore, in a case where all of the above respective conditions is not established, the controller 32 executes usual control to set the control period of the outdoor expansion valve 6 to 1 sec and to set a maximum operation amount to 500 pulses (no limit). On the other hand, in the case where one of the above respective conditions or any combination of the conditions or all of the conditions is established, the controller 32 executes operation limit control to lengthen the control period of the outdoor expansion valve 6 to 4 sec and to also suppress the maximum operation amount within a limit value of 36 pulses.

Also in the case of this embodiment, the ECCV operation limit section 64 mentioned above outputs a limit F/B control amount TGECCVscfbLim to which an operation limit by the operation limit control of the outdoor expansion valve 6 is added. Consequently, a duty factor to the coil of the outdoor expansion valve 6 is suppressed to 35% or less (not more than the predetermined value), and the temperature of the coil is controlled to be not in excess of a heat resistant temperature TcoilHiLim2 (a predetermined value).

In this way, according to the controller 32, each of the condition that the ambient temperature of the outdoor expansion valve 6 is high, the condition that the temperature of the engine cooling water is high, the condition that the engine lubricating oil temperature is high, the condition that the engine suction air temperature is high, and the condition that the velocity is slow and that the ambient temperature is high is a condition that the temperature of the coil of the outdoor expansion valve 6 is easy to rise. Therefore, even when the controller executes the operation limit control in the case where one of the conditions or any combination of the conditions or all of the conditions is established as in this embodiment, it is possible to effectively achieve protection of the outdoor expansion valve 6.

It is to be noted that the controller does not have to execute the above-mentioned operation limit control of the outdoor expansion valve 6 when returning a valve position of the outdoor expansion valve 6 to an initial position. Consequently, it is possible to rapidly perform so-called initialization of the outdoor expansion valve 6, and it is possible to secure control properties. Furthermore, the controller does not have to execute the above-mentioned operation limit control of the outdoor expansion valve 6 in the heating mode and/or the dehumidifying and heating mode. It can be considered that an environment to perform the heating mode or the dehumidifying and heating mode is an environment where the outdoor air temperature that is the ambient temperature of the coil of the outdoor expansion valve 6 is low, and hence it is not necessary to limit the duty factor to the coil of the outdoor expansion valve 6. Consequently, it is possible to secure the control properties in the heating mode or the dehumidifying and heating mode.

Furthermore, in the above embodiments, the present invention is applied to the vehicle air conditioner 1 which changes and executes the respective operation modes of the heating mode, the dehumidifying and heating mode, the internal cycle mode, the dehumidifying and cooling mode and the cooling mode, but the present invention is not limited to the embodiments, and the present invention may be executed, except in the cooling mode to fully open the outdoor expansion valve 6, or may be applied only to one of the operation modes or any combination of two or three modes.

Furthermore, the constitution and respective numeric values of the refrigerant circuit described in the above embodiments are not limited, and are changeable without departing from the gist of the present invention. Furthermore, in the embodiments, the present invention is applied to the vehicle air conditioner, but the present invention is not limited to the vehicle air conditioner, and the present invention is effective for various refrigeration devices each having a refrigerant circuit including an electronic expansion valve.

DESCRIPTION OF REFERENCE NUMERALS

1 vehicle air conditioner (refrigeration device)
2 compressor
3 air flow passage
4 radiator
6 outdoor expansion valve (electronic expansion valve)
7 outdoor heat exchanger
8 indoor expansion valve
9 heat absorber
32 controller (control means)
33 outdoor air temperature sensor
34 engine room temperature sensor
52 velocity sensor
R refrigerant circuit

The invention claimed is:

1. A refrigeration device which has a refrigerant circuit comprising an electronic expansion valve, and
which comprises a controller for controlling energization to a coil of the electronic expansion valve,
wherein the controller executes operation limit control to limit an operation of the electronic expansion valve so that a temperature of the coil of the electronic expansion valve is not in excess of a predetermined value,
wherein the electronic expansion valve requires predetermined energization before and after the operation to hold its position, and
wherein the controller is configured to lengthen a control period of the electronic expansion valve and suppress an operation amount of the electronic expansion valve within a predetermined limit value to limit a duty factor range in which the energization before and after the operation to hold its position and an energization for the electronic expansion valve operation can be performed, in the operation limit control, so that the temperature of the coil of the electric expansion valve is not in excess of the predetermined value.

2. The refrigeration device according to claim 1, wherein the controller is configured to execute the operation limit control in a case where the temperature of the coil rises to the predetermined value.

3. The refrigeration device according to claim 2, wherein the controller is configured to estimate the temperature of the coil on the basis of an energizing situation to the coil of the electronic expansion valve, and an ambient temperature of the electronic expansion valve or the highest temperature presumed at the ambient temperature.

4. The refrigeration device according to claim 1, wherein the predetermined value comprises a first predetermined value, and wherein the controller is configured to execute the operation limit control in a case where there is established one of a condition that the ambient temperature of the electronic expansion valve is not less than the first predetermined value, a condition that a temperature of engine cooling water is not less than a second predetermined value when performing vehicle interior air conditioning of a car, a condition that an engine lubricating oil temperature is not less than a third predetermined value when performing the vehicle interior air conditioning of the car, a condition that an engine suction air temperature is not less than a fourth predetermined value when performing the vehicle interior air conditioning of the car, and a condition that a velocity is not more than a fifth predetermined value and an outdoor air temperature is not less than a sixth predetermined value when performing the vehicle interior air conditioning of the car, or any combination of the conditions, or all of the conditions.

5. The refrigeration device according to claim 2, wherein the controller is configured to cancel the operation limit control or increase a limit value in a case where the operation amount of the electronic expansion valve has a margin to the limit value, when the controller executes the operation limit control.

6. The refrigeration device according to claim 2, wherein the controller is configured to integrate a difference between the limit value and the operation amount of the electronic expansion valve when executing the operation limit control, and the controller is configured to cancel the operation limit control or increases the limit value in a case where the integrated value enlarges to a predetermined value or more.

7. The refrigeration device according to claim 1, wherein the controller does not execute the operation limit control in a transitional stage of an operating state.

8. The refrigeration device according to claim 1, wherein the controller does not execute the operation limit control when returning a valve position of the electronic expansion valve to an initial position.

9. The refrigeration device according to claim 1, wherein the controller does not execute the operation limit control in a mode to perform heating and/or a mode to perform dehumidifying and heating by the refrigerant circuit.

* * * * *